United States Patent
Nakamoto

(10) Patent No.: US 10,882,970 B2
(45) Date of Patent: Jan. 5, 2021

(54) RESIN FOAM PARTICLES, RESIN FOAM SHAPED PRODUCT, AND LAMINATE

(71) Applicant: ASAHI KASEI KABUSHIKI KAISHA, Tokyo (JP)

(72) Inventor: Tetsuo Nakamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/484,241

(22) PCT Filed: Feb. 13, 2018

(86) PCT No.: PCT/JP2018/004927
§ 371 (c)(1),
(2) Date: Aug. 7, 2019

(87) PCT Pub. No.: WO2018/147464
PCT Pub. Date: Aug. 16, 2018

(65) Prior Publication Data
US 2020/0032023 A1    Jan. 30, 2020

(30) Foreign Application Priority Data

Feb. 13, 2017 (JP) ................................. 2017-024111
Mar. 31, 2017 (JP) ................................. 2017-072789

(51) Int. Cl.
*B32B 5/18* (2006.01)
*C08J 9/12* (2006.01)
(Continued)

(52) U.S. Cl.
CPC ............ *C08J 9/122* (2013.01); *B29C 44/3461* (2013.01); *B32B 5/18* (2013.01); *B32B 5/245* (2013.01);
(Continued)

(58) Field of Classification Search
CPC ...... B29C 44/00; B29C 44/3461; B29C 67/20; B29K 2071/12; B29K 2077/00;
(Continued)

(56) References Cited

U.S. PATENT DOCUMENTS

| | | |
|---|---|---|
| 5,622,756 A | 4/1997 | Tokoro et al. |
| 2012/0115968 A1 | 5/2012 | Shima et al. |
| 2013/0266792 A1 | 10/2013 | Nohara et al. |

FOREIGN PATENT DOCUMENTS

| | | |
|---|---|---|
| JP | H03224727 A | 10/1991 |
| JP | H07137063 A | 5/1995 |

(Continued)

OTHER PUBLICATIONS

May 22, 2018, International Search Report issued in the International Patent Application No. PCT/JP2018/004927.

(Continued)

*Primary Examiner* — Lawrence D Ferguson
(74) *Attorney, Agent, or Firm* — Kenja IP Law PC

(57) ABSTRACT

Provided are resin foam particles that enable shaping of a sound absorbing member having excellent sound absorption performance through a resin foam shaped product. Also provided is a laminate that includes a resin foam shaped product as a base material and with which high sound absorption performance can be obtained even when the laminate is a thin material. The resin foam particles contain a resin and have a recessed external part. A ratio $\rho_0/\rho_1$ of density of the resin $\rho_0$ and true density $\rho_1$ of the resin foam particles is 2 to 20, and a ratio $\rho_1/\rho_2$ of true density $\rho_1$ of the resin foam particles and bulk density $\rho_2$ of the resin foam particles is 1.5 to 4.0.

3 Claims, 4 Drawing Sheets

(51) Int. Cl.
*B29C 44/34* (2006.01)
*B32B 5/24* (2006.01)
*B29K 71/00* (2006.01)
*B29K 77/00* (2006.01)
*B29K 105/00* (2006.01)

(52) U.S. Cl.
CPC ...... *B29K 2071/12* (2013.01); *B29K 2077/00* (2013.01); *B29K 2105/0026* (2013.01); *B32B 2266/0214* (2013.01); *B32B 2305/022* (2013.01); *B32B 2307/72* (2013.01); *C08J 2367/02* (2013.01); *C08J 2371/12* (2013.01); *C08J 2377/02* (2013.01)

(58) Field of Classification Search
CPC .... B29K 2105/0026; B32B 2266/0214; B32B 2305/022; B32B 2307/72; B32B 27/08; B32B 5/18; B32B 5/245; C08J 2323/06; C08J 2323/12; C08J 2367/02; C08J 2367/03; C08J 2371/12; C08J 2377/02; C08J 2377/12; C08J 9/0095; C08J 9/122; C08J 9/16; C08J 9/18; C08J 9/232
See application file for complete search history.

(56) References Cited

FOREIGN PATENT DOCUMENTS

| | | |
|---|---|---|
| JP | H07168577 A | 7/1995 |
| JP | H08108441 A | 4/1996 |
| JP | H10183811 A | 7/1998 |
| JP | H10329220 A | 12/1998 |
| JP | H11207759 A | 8/1999 |
| JP | 2000210967 A | 8/2000 |
| JP | 2000302909 A | 10/2000 |
| JP | 2002096323 A | 4/2002 |
| JP | 2008146001 A | 6/2008 |
| JP | 2009226675 A | 10/2009 |
| JP | 2012102201 A | 5/2012 |
| JP | 3186731 U | 10/2013 |
| JP | 2015174398 A | 10/2015 |
| JP | 2016125041 A | 7/2016 |
| WO | 2012081490 A1 | 6/2012 |

OTHER PUBLICATIONS

Jan. 15, 2020, the Supplementary European Search Report issued by the European Patent Office in the corresponding European Patent Application No. 18751898.0.

RESIN FOAM PARTICLES, RESIN FOAM SHAPED PRODUCT, AND LAMINATE

TECHNICAL FIELD

The present disclosure relates to resin foam particles having a particular shape and also to a resin foam shaped product and a laminate having excellent sound absorption performance that are obtained by fusing and shaping resin foam particles and that include continuous pores.

BACKGROUND

Resin foam materials are being used as structural materials for components of automobiles and electronic devices and for containers in place of conventional solid resin materials and metal materials. These resin foam materials have features such as low density, high heat insulation, and shock absorption, and it is mainly these characteristics that are effectively exploited. On the other hand, characteristics such as sound absorption and sound insulation are also anticipated for resin foam materials, but as of yet, the scope of use thereof has been limited.

The reason for this is that sound absorption and sound insulation are not characteristics that are displayed by all foams and these characteristics are dependent on the cell structure. Foams having a closed cell structure, which is a structure in which adjacent cells in the foam structure are separated by walls of resin, have excellent rigidity and mechanical strength, but extremely low sound absorption and sound insulation performance. In contrast, foams having an open cell structure in which cell walls have broken or disappeared have excellent sound absorption and sound insulation performance, but poor rigidity and mechanical strength. Thus, such attributes tend to conflict with one another, which makes it difficult to achieve these attributes together.

Urethane resin and melamine resin are examples of open cell resin foams and the main uses thereof are for sponges that absorb fluids and for cushioning materials that exploit the flexibility and shock absorption performance thereof. These resins are also widely used as sound absorbing materials due to displaying excellent sound absorption and being light compared to inorganic materials. However, the low rigidity of these resins means that they are mainly used as constituent layers of laminates with other structural materials, rather than as structural materials on their own.

The main production methods for foams are bead foam molding and extrusion foam molding. Bead foam molding is a method having a shaping mechanism whereby particulate resin foam particles that are obtained through preliminary foaming of resin particles are loaded into a mold for shaping having a desired shape and are then fused by thermal expansion to form a shaped article and has advantages compared to extrusion foam molding in terms that foam goods having various complex three-dimensional shapes can be produced with high productivity, that there is no material loss due to machining, and that the mold for shaping can be produced at low cost. Therefore, bead foam molding is particularly preferable as a shaping method of foams for various structural members. However, since the foam molding process in bead foam molding has a mechanism whereby fusion occurs between foam particles due to expansion of cells that are closed cells separated by resin films, the cell structure of the foam that is normally obtained is basically a closed cell structure, which generally results in poor sound absorption performance.

On the other hand, foams having a structure of continuous pores therein (i.e., a connected pore structure) through bead foam molding and production methods thereof have been proposed as per the following examples, and it is known that such foams can be used as sound absorbing foam materials.

Patent Literature (PTL) 1 describes a method in which columnar polyolefin-based resin foam particles are fused to one another while positioned in irregular directions without alignment to obtain a shaped product having connected pores. However, it has been difficult to put this method into practical use due to problems such as poor packing tending to occur when resin foam particles are loaded into a mold due to the long and thin shape of the resin foam particles and difficulty of obtaining a balance of porosity of the shaped product and fusion strength of the shaped product.

PTL 2 describes a method in which thermoplastic resin foam particles that satisfy a specific relationship between bulk density and true density and that have shape parameters satisfying specific conditions are impregnated with a physical blowing agent, and particulate resin foam particles having a porous structure are foamed inside a mold to obtain a thermoplastic resin foam shaped product including connected pores that has excellent water permeability and sound absorption. However, the described foam is a foam in which pores are formed by a particulate foam of an ethylene propylene random polymer or low-density polyethylene that is hollow or has a cross-type cross-section, the strength and sound absorption performance thereof are not specifically described, and suitability as a sound absorbing material having a porous structure is unclear.

In a method described in PTL 3 in which a large number of resin foam particles are unified through surface joining of part of the surface of adjacent resin foam particles to achieve a volume porosity of 15% to 40% relative to the total volume, production is carried out through attachment of a resin for adhesion to the surfaces of foamable resin particles. The resin for adhesion enables thermal adhesion at a lower temperature than the softening temperature of the particles. However, disadvantages of this method are that a step of attaching a thermally adhesive resin to resin foam particles is required, leading to lower productivity, the balance of strength and porosity is inadequate, and the porosity is limited to 40% or less. The foams given as examples are only those of vinylidene chloride-based copolymers, and a foam structure for obtaining the sound absorption performance described in the claims is not indicated.

In a method described in PTL 4, a technique is disclosed for producing a polyolefin-based foam having excellent water permeability by fusing and unifying tubular resin foam particles of a polyolefin-based resin for which the three-dimensional shape, size, and relationship between bulk density and true density of the resin foam particles are within specific ranges. However, PTL 4 does not disclose performance as a sound absorbing material, and suitability of a porous structure is unclear.

In a method described in PTL 5, it is disclosed that a shaped product having excellent sound absorption over a wide frequency range can be obtained through in-mold foaming of hollow cylindrical resin foam particles when shaped product porosity and bulk density are set within specific ranges. However, sound absorption performance is inadequate, thickness of the shaped product is required, and physical properties such as mechanical strength are not disclosed.

PTL 6 describes a method in which the impregnation state of resin particles with a blowing agent prior to preliminary foaming is controlled, thermoplastic resin foam particles having a drum shape are produced, and then foam product having pores are produced by foaming and fusion inside a mold. However, drawbacks are that the pore structure of a foam shaped product is restricted because the shape is limited to a drum-type and that control of the impregnation state of resin particles with a blowing agent is difficult.

Although in relation to general-purpose resins such as polyolefin-based resins (for example, polyethylene, polypropylene, and ethylene-propylene copolymer) and vinylidene chloride-based resins there is prior literature that suggests the expression of a sound absorption effect by a foam formed through fusion of a particulate foam that forms connected pores as in PTL 1 to 6, the relationship between the fine structure of the foam and sound absorption performance is unclear, and, in particular, no disclosure is made in relation to specifying the structure of connected pores and what type of form is suitable for the structure of foam beads by which the pores are formed.

It seems that foam shaped products in which pore structures have been induced and production techniques therefor are yet to be established for other typical resins. In particular, resin foam particles that form connected pores and that have resins other than general-purpose resins (for example, so-called "engineering resins" excelling in terms of functions such as heat deformation resistance, solvent resistance, flame retardance, etc.) as materials thereof, production techniques for foam shaped products having connected pores that are formed through fusion of such resin foam particles, and sound absorption performance of such foam shaped products are currently unknown.

On the other hand, laminates including a plurality of laminated materials are known as soundproofing materials having high sound absorption performance. Examples of such laminates are given below.

PTL 7 describes a laminate in which a skin part formed by a synthetic resin layer including micropores is directly adhered, without an adhesive, to at least one side of a base material formed by a non-woven fabric or a continuous resin foam. Examples given of the continuous resin foam serving as a base material include foams of polyethylene resin, polypropylene resin, polyurethane resin, polyester resin, acrylic resin, polystyrene resin, and the like, and crosslinked foams, but these examples are limited to materials that are not hard and have low heat resistance. Soft urethane foam is described as an example of a base material that is preferable in terms of sound absorption. As is clear from the example of use as a pasted material for the interior of a vehicle, this is not a material that is used as a freestanding structural material.

PTL 8 describes a laminate that is a soundproofing material in which a fibrous sound absorbing material, a sound insulating layer, and a foamed resin are stacked in order. An example given for the fibrous sound absorbing layer is recovered felt obtained by using binder fibers to felt fibers of low melting point polyester, fine polyester, polyester, wool, acrylic, cotton, or the like as recovered material. The sound insulating layer is formed as an intermediate layer in formation of a foam layer in the presence of the fibrous sound absorbing layer. Accordingly, resins that can be selected for a base material layer are limited and productivity is thought to be low due to production by casting reaction curing. As can be seen from the examples given for the foamed resin serving as a base material, which are foamed polyurethane, foamed polyethylene, and foamed polypropylene, the foamed resin is not a hard structural material and is limited to resins having low heat resistance.

PTL 9 describes a composite sound absorbing material that is a laminate in which a foamed resin layer is laminated on one surface of a non-woven fabric layer containing cotton fibers. Examples of the non-woven fabric layer containing cotton fibers include those obtained by mixing cotton fibers and thermally adhesive fibers as constituent fibers, with examples of fibers other than cotton fibers including chemical fibers of polyester, polyamide, polypropylene, polyethylene, acrylic, rayon, or the like and natural fibers of hemp, wool, silk, or the like. Foamed polyurethane, foamed polyethylene, and foamed polypropylene are described as examples of the foamed resin layer serving as a base material, but these foamed resins are not hard structural materials and are limited to resins having low heat resistance.

PTL 10 describes a laminate in which a short fiber non-woven fabric and a sound absorbing film layer formed by a synthetic resin film are laminated. A film of polyolefin resin, polyolefin copolymer resin, polyester resin, or polyamide resin having a thickness of 20 μm to 60 μm is laminated on one side of the non-woven fabric. This laminate exploits an effect whereby sound waves that are incident on the laminate are converted to vibration of the film. However, the surface layer film is a thin layer and the base material layer is a non-woven fabric layer, and thus the laminate is not a laminate that is used as a hard structural material.

A soundproofing panel described in PTL 11 is a structural material that includes a sound insulating sheet laminated at one side of a hard synthetic resin plate having numerous connected holes and a porous sheet laminated at the other side of the synthetic resin plate. Polyolefin-based resin, polystyrene-based resin, urea resin, phenolic resin, vinyl chloride-based resin, and the like are given as examples of the base material resin of the synthetic resin plate, but these are limited to resins having low heat resistance and thermosetting resins. Moreover, the porous sheet is provided for surface protection of the synthetic resin plate and although non-woven fabric is given as an example, this is not expected to provide an effect of sound absorption and specific examples are not provided. Furthermore, the sound insulating sheet is a resin sheet and is not a non-woven fabric. Accordingly, no mention is made of a sound absorption effect of a laminate having the hard synthetic resin plate including numerous connected holes as a base material.

PTL 12 describes a foam molded product with an attached skin that is a laminate obtained by a method in which a skin material formed by a material that does not having air permeability or has poor air permeability or a skin material formed by a woven fabric or a non-woven fabric at an outer surface side is set in a mold, particles, chips, or a pulverized material formed from a thermoplastic resin foam is loaded into the mold, and the foam is fused while also fusing and unifying the foam and the skin material. In-mold shaping is possible by adopting a state with a high space fraction through selection of the form of the particles. Although a skin material including a non-woven fabric at an outer surface side is described as the skin material, no mention is made of a laminate of a thermoplastic foam including connected holes and a non-woven fabric, and since only a resin sheet of polypropylene-based thermoplastic elastomer or the like is given as a specific example, no suggestion is made of enhancement of a sound absorption effect through lamination. Resins given as examples of the base material resin are limited to vinyl chloride-based resins, polyolefin-based resins, acrylic-based resins, and polycarbonate resins, and do not include resins having high heat resistance.

In recent years, however, there has been demand for thin structures having even better sound absorption performance.

CITATION LIST

Patent Literature

PTL 1: JP H3-224727 A
PTL 2: JP H7-137063 A
PTL 3: JP H7-168577 A
PTL 4: JP H8-108441 A
PTL 5: JP H10-329220 A
PTL 6: JP 2000-302909 A
PTL 7: JP 2008-146001 A
PTL 8: JP 2009-226675 A
PTL 9: JP 3186731 U
PTL 10: JP 2015-174398 A
PTL 11: JP H10-183811 A
PTL 12: JP H11-207759 A

SUMMARY

Technical Problem

An objective of the present disclosure is to provide resin foam particles that enable shaping of a sound absorbing member having excellent sound absorption performance through a resin foam shaped product. Another objective of the present disclosure is to provide a laminate that has a resin foam shaped product as a base material and with which high sound absorption performance can be obtained even when the laminate is a thin material.

Solution to Problem

As a result of diligent investigation conducted with the aim of solving the problems set forth above, the inventor discovered that, surprisingly, a novel resin foam shaped product that has connected pores with a specific structure and that is formed by a process of thermally fusing resin foam particles having a specific shape, for example, displays high sound absorption performance and mechanical strength that have not been seen in conventional foams, and can serve as a suitable structural material having sound absorption and sound insulation performance, and also discovered that by selecting a thermoplastic resin having a surface tension within a specific range as a raw material resin of this resin foam shaped product, the resin foam shaped product can serve as a freestanding, sound absorbing, structural material having both a high level of sound absorption performance and performance in terms of any aspects selected from mechanical strength, heat resistance, heat deformation resistance, flame retardance, solvent resistance, and rigidity. In this manner the inventor completed the present disclosure.

Moreover, the inventor discovered that through inclusion of a base material including the novel resin foam shaped product having connected pores with a specific structure and through inclusion of a specific surface material, high sound absorption performance can be displayed even in the case of a thin structure, which was not previously possible. Furthermore, the inventor discovered that by selecting a thermoplastic resin having a surface tension within a specific range as a raw material resin, this structure can serve as a layered, sound absorbing, structural material of a freestanding type that has both an even higher level of sound absorption performance and performance in terms of any aspects selected from mechanical strength, heat resistance, heat deformation resistance, flame retardance, solvent resistance, and rigidity, and in this manner completed the present disclosure.

Specifically, the primary features of the present disclosure are as follows.

[1] Resin foam particles comprising a resin and having a recessed external part, wherein a ratio $\rho_0/\rho_1$ of density $\rho_0$ of the resin and true density $\rho_1$ of the resin foam particles is 2 to 20, and a ratio $\rho_1/\rho_2$ of true density $\rho_1$ of the resin foam particles and bulk density $\rho_2$ of the resin foam particles is 1.5 to 4.0.

[2] The resin foam particles according to the foregoing [1], having an average particle diameter of 0.5 mm to 6.0 mm.

[3] The resin foam particles according to the foregoing [1] or [2], wherein the resin has a surface tension of 37 mN/m to 60 mN/m at 20° C.

[4] The resin foam particles according to any one of the foregoing [1] to [3], wherein the resin has a glass-transition temperature of not lower than −10° C. and not higher than 280° C.

[5] A resin foam shaped product obtained by fusing together the resin foam particles according to any one of the foregoing [1] to [4], wherein the resin foam shaped product includes pores that are continuous between the resin foam particles that have been fused and has a porosity of 15% to 80%.

[6] A soundproofing member comprising the resin foam shaped product according to the foregoing [5].

[7] A laminate comprising a surface material (I) including a fiber assembly and a base material (II) including the resin foam shaped product according to the foregoing [5], wherein the fiber assembly has a mass per unit area of 10 g/m² to 300 g/m², an average apparent density of 0.10 g/cm³ to 1.0 g/cm³, an average fiber diameter of 0.6 μm to 50 μm, and an air permeability of 2 cc/(cm²·sec) to 70 cc/(cm²·sec), and the laminate has a thickness of 3 mm to 80 mm.

[8] The laminate according to the foregoing [7], wherein the surface material (I) is a fiber assembly laminate including three layers that are a thermoplastic synthetic fiber layer (A) having an average fiber diameter of 5 μm to 50 μm as one surface layer, a thermoplastic synthetic microfiber layer (B) having an average fiber diameter of 0.3 μm to 10 μm as an intermediate layer, and a layer (C) containing thermoplastic synthetic fibers having an average fiber diameter of 5 μm to 50 μm as another surface layer, or is a fiber assembly laminate composite obtained through stacking of 2 to 30 sheets of the fiber assembly laminate.

[9] The laminate according to the foregoing [7] or [8], wherein the laminate is a freestanding soundproofing material.

Advantageous Effect

According to the present disclosure, it is possible to provide resin foam particles that enable shaping of a sound absorbing member having excellent sound absorption performance through a resin foam shaped product. Moreover, according to the present disclosure, it is possible to provide a laminate that has a resin foam shaped product as a base material and with which high sound absorption performance can be obtained even when the laminate is a thin material.

DETAILED DESCRIPTION

Not only does a resin foam shaped product including connected pores that is obtained through fusing and foam shaping of resin foam particles of a particular shape according to a present embodiment have excellent sound absorption performance, excel as a structural material, and be useable for various sound absorbing members, but also has high compatibility with an automated assembly line as a hard foam that is a member having excellent ease of fitting assembly with foams and members other than foams, and can be effectively used for sound absorption goods with excellent productivity.

Moreover, by using a specific raw material resin, it is possible to obtain a novel resin foam shaped product that also has performance in terms of one or more selected from the group consisting of mechanical strength, heat resistance, heat deformation resistance, flame retardance, solvent resistance, and rigidity.

A laminate including a base material that includes a novel resin foam shaped product of the present embodiment having connected pores with a specific structure and including a specific surface material can suitably be used as a sound absorbing member that is thin and has excellent sound absorption performance.

Moreover, by using a specific raw material resin, it is possible to obtain a novel laminate that also has performance in terms of one or more selected from the group consisting of mechanical strength, heat resistance, heat deformation resistance, flame retardance, solvent resistance, and rigidity.

[Resin Foam Particles]

The resin foam particles according to the present disclosure are required to have a recessed external part (i.e., have a recessed part in the exterior thereof as viewed from at least one direction).

Figure 1:
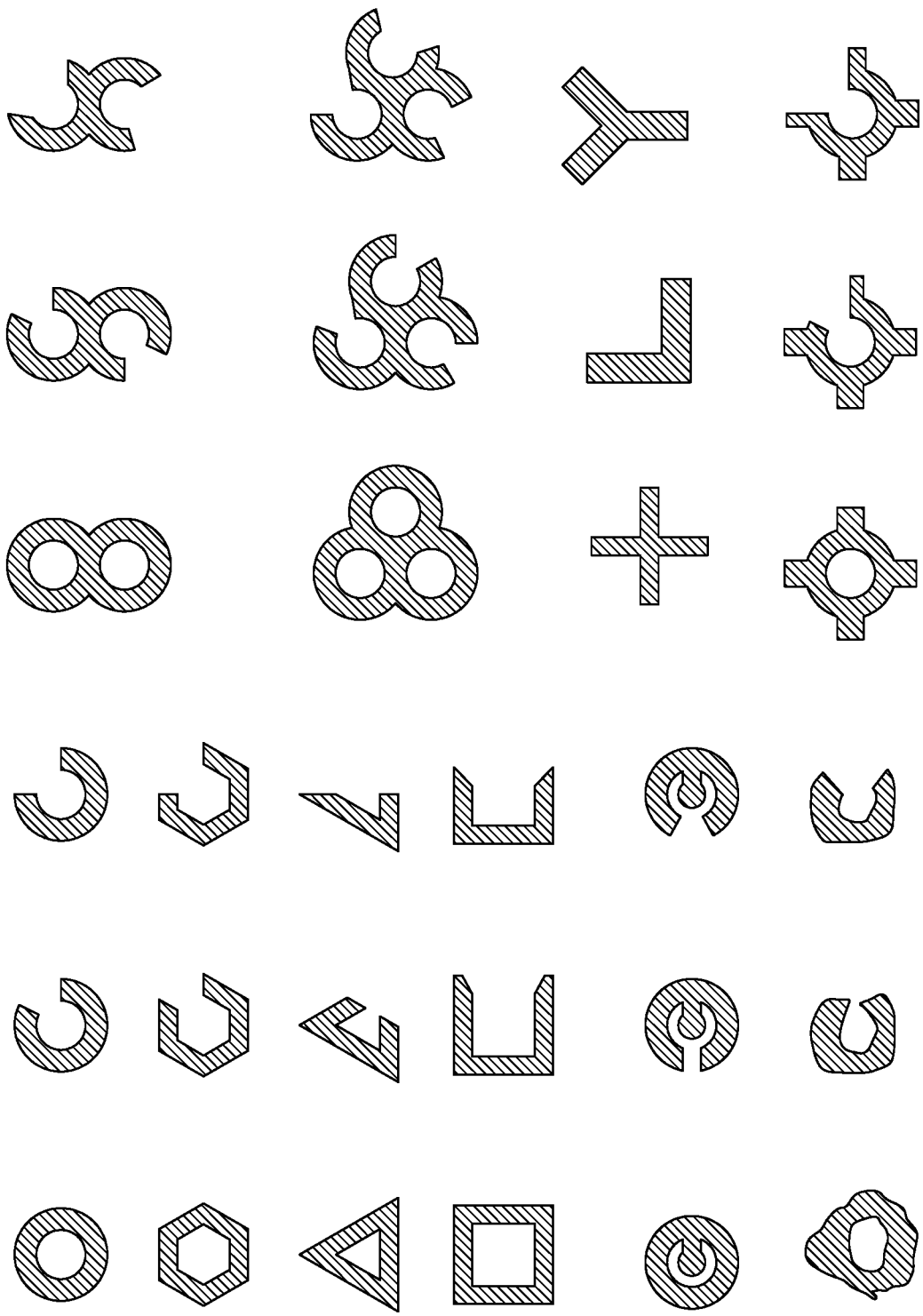
FIG. 1 illustrates examples of cross-sectional views of resin foam particles of a present embodiment.

The phrase "having a recessed external part" as used in the present specification means that there is a direction for which an orthographic projection of a resin foam particle is a recessed geometric shape. The term "recessed geometric shape" as used in the present specification means that it is possible to select two points on the outer surface of an orthographic projection geometric shape that constitutes this recessed geometric shape such that at least part of a line segment linking these points (preferably the whole line segment) is a line segment passing through a region external to the resin foam particle. Examples of recessed geometric shapes are illustrated in FIG. 1.

Note that the recessed external part is a different structure to foam cells formed during foaming.

One recessed external part may be present or a plurality of recessed external parts may be present.

The recessed external part may be one or more through holes that connect surfaces of the resin foam particle, may be one or more recesses that do not pass through the particle, or may be a combination of one or more through holes and one or more recesses. Moreover, a through hole may be a cavity that links two holes formed at the outer surface the resin foam particle or may have a structure such that in an orthographic projection in which the cavity appears, an orthographic projection in which the cavity is surrounded by the resin foam particle (i.e., an orthographic projection in which the cavity forms an isolated cavity in the resin foam particle) is obtained.

In a resin foam particle of the present embodiment, a region A surrounded by a straight line circumscribing the recess at two or more points and the outer surface of the resin foam particle as a proportion relative to a region occupied by the resin foam particle in an orthographic projection in which the recess can be confirmed (region A/region occupied by resin foam particle) is preferably 10% or more, and more preferably 30% or more. In particular, it is preferable that any of the ranges set forth above is satisfied in an orthographic projection including a deepest part of the recess. The deepest part of the recess may be a part for which the distance to an intersection point with the outer surface of the recess along a perpendicular line to a straight line circumscribing the recess at two or more points is longest.

In a case in which the recessed external part is a through hole, in an orthographic projection of the resin foam particle in which the through hole can be confirmed, the area of the through hole relative to the total area of the orthographic projection of the resin foam particle is preferably 10% or more, and more preferably 30% or more. In particular, any of the ranges set forth above is preferably satisfied in an orthographic projection of the resin foam particle in which the area of the through hole is largest. Moreover, in a cross-section in which the penetrating cavity shape of the through hole can be confirmed, the area of the cavity shape relative to the total area of the resin foam particle in the cross-section is preferably 10% or more, and more preferably 30% or more. The through hole preferably has at least one plane in which the area of the cavity shape satisfies the above, and more preferably satisfies any of the ranges set forth above in all cross-sections.

By selecting the shape of the resin foam particles such that the recessed external part satisfies the recess conditions and/or through hole conditions set forth above, connected pores (pores that are continuous, pores that are connected) can favorably be formed in a resin foam shaped product obtained after fusion and shaping.

In the present embodiment, although the recessed external part of the resin foam particles may or may not be a through hole, it is particularly preferable that the resin foam particles have a shape including a recess. Through a shape including a recess, a packing state that is not seen with conventional resin foam particles is obtained and an excellent balance of both sound absorption performance and mechanical strength can be realized through the structure of connected pores in a resin foam shaped product obtained after shaping.

A structure in which a groove shaped recess is provided in the resin foam particles is an example of a shape having a recess that is particularly advantageous. In production of a resin foam shaped product, resin foam particles having adjacent groove shaped recesses adopt a packing state in which they are partially engaged with one another during thermal fusion between resin foam particles and become joined. This leads to the formation of a high-strength resin foam shaped product in which the joining area between resin foam particles is large while also causing pores extending between resin foam particles (i.e., connected pores) to form in a case in which adjacent resin foam particles are joined in a form with the grooves thereof linked.

The groove shaped recess may be, for example, a shape (FIGS. 2A and 2B) resulting from stacking cross-sections (FIG. 1) of a shape obtained by cutting out part of an approximate circle that is hollow (for example, a C shape or a U shape) or a shape resulting from stacking cross-sections (FIG. 1) obtained by cutting out part of an approximate polygon that is hollow (for example, a triangle or a quadrilateral). The hollow of the approximate circle or the hollow of the approximate polygon may be an approximate circle or an approximate polygon, but is preferably the same shape as the shape surrounding the hollow. Moreover, it is preferable to adopt a shape such as that of concentric circles in which the center of the shape of the hollow and the center of the shape surrounding the hollow overlap.

Figure 2A:
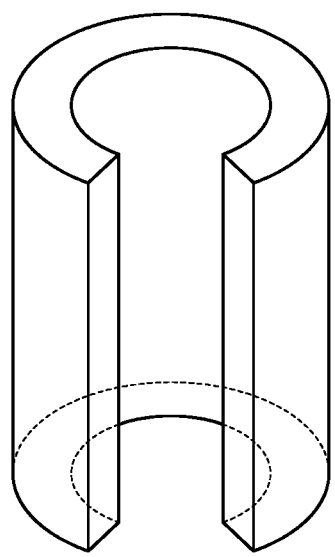
FIGS. 2A and 2B are perspective views of resin foam particles of a present embodiment.
Figure 2B:
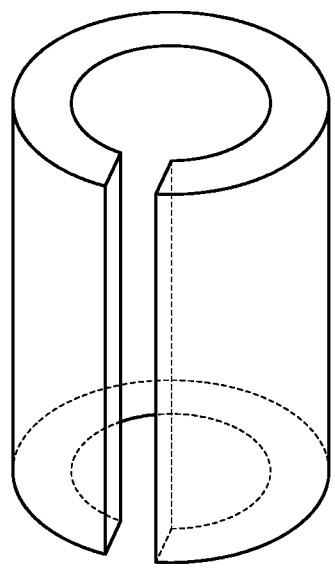

Examples of the recess include, for example, a saddle-like shape resulting from bending of a circular disc shape of certain thickness, a shape formed by bending or folding a circular disc in an out of plane direction, or a structure obtained by providing one or more recesses in a circular tube-like outer surface. An example of a particle shape that is particularly preferable in terms of ease of production, excellent productivity, and ease of shape control is a shape obtained by cutting out, from a circular column, a circular column having a smaller external diameter but the same axis and height to obtain a circular tube, and then cutting out a portion of the circular tube within a certain angle as viewed in the axial direction (FIGS. 2A and 2B). This shape is referred to below as a C-type cross-section partial-circle tube shape. Note that shapes that are substantially the same but with slight modifications can form similar pores in a resin foam shaped product and may be used within the scope of the present disclosure so long as the conditions described above are satisfied. FIGS. 2A and 2B illustrate preferable examples of the C-type cross-section partial-circle tube shape that differ in terms of size of the cut out portion.

The recess preferably has the same shape when cross-sections are formed successively relative to a specific direction of the resin foam particle. For example, as illustrated in FIGS. 2A and 2B, the shape of the recess in a cross-section relative to one direction of the resin foam particle (up/down direction in FIGS. 2A and 2B, extrusion direction) is preferably the same as the shape of the recess in a different cross-section formed upon shifting in the one direction.

Although each resin foam particle may have the same shape or differing shapes when cross-sections are successively formed relative to the specific direction, it is preferable that the shape is the same.

In the present embodiment, the presence of a recessed external part in a resin foam particle can be confirmed by observing a transmission image of the resin foam particle under an optical microscope while changing the observation direction of the particle, and then making a judgement.

In the resin foam particles of the present embodiment, a ratio $\rho_0/\rho_1$ of the density $\rho_0$ of a resin contained in the resin foam particles and the true density $\rho_1$ of the resin foam particles is required to be 2 to 20, is preferably 2.2 to 18, and is more preferably 2.5 to 15. A $\rho_0/\rho_1$ ratio of less than 2 is undesirable because expression of sound absorption performance is inadequate, whereas a $\rho_0/\rho_1$ ratio of more than 20 is undesirable because mechanical strength decreases.

In the resin foam particles of the present embodiment, a ratio $\rho_1/\rho_2$ of the true density $\rho_1$ of the resin foam particles and the bulk density $\rho_2$ of the resin foam particles is required to be 1.5 to 4.0, is preferably 1.8 to 3.5, and is more preferably 2 to 3. A $\rho_1/\rho_2$ ratio of less than 1.5 is undesirable because sound absorption performance is inadequate, whereas a $\rho_1/\rho_2$ ratio of more than 4.0 is undesirable because mechanical strength decreases.

In the present specification, the bulk density $\rho_2$ is a value $M/V_2$ obtained by dividing a given weight M of the resin foam particles by the bulk volume $V_2$ of the resin foam particles having that weight M and the true density $\rho_1$ is a value $M/V_1$ obtained by dividing a given weight M of the resin foam particles by the true volume $V_1$ of the resin foam particles having that weight M. The bulk volume $V_2$ is a value read from the scale of a graduated cylinder when the given weight M of the resin foam particles is loaded into the cylinder and then the graduated cylinder is vibrated until the volume of the resin foam particles becomes constant. The true volume $V_1$ is the increase in volume of liquid that occurs when the given weight M of the resin foam particles is submerged in a graduated cylinder holding a liquid in which the resin foam particles do not dissolve.

The density $\rho_0$ of the resin is the density of the raw material resin prior to foaming and is the density measured by water submersion using a gravimeter.

In the present specification, $\rho_0$, $\rho_1$, and $\rho_2$ all refer to values obtained through measurement in an environment of 20° C. and 0.10 MPa.

The average particle diameter of the resin foam particles in the present embodiment can be measured by measuring 100 g of the resin foam particles by a classification method using standard sieves prescribed by JIS Z8801. The average particle diameter of the resin foam particles is preferably 0.5 mm to 6.0 mm, more preferably 0.7 mm to 5.0 mm, even more preferably 1.0 mm to 4.0 mm, and particularly preferably 1.2 mm to 3.0 mm. An average particle diameter of less than 0.5 mm is undesirable because handling during production becomes difficult, whereas an average particle diameter of more than 6.0 mm is undesirable because surface precision of a complicated shaped article tends to decrease.

The method by which the resin foam particles of the present embodiment are produced may be any method that can impart the desired external shape on particles such as a method using thermoplasticity of a thermoplastic resin or a method involving post-processing such as machining of particles in a solid state. Of such methods, profile extrusion using a die provided with a discharge cross-section having a particular shape can suitably be used as a method of producing particles of a consistent shape with excellent productivity. Production can be carried out by adopting any conventional and commonly known method such as a method in which a thermoplastic resin is melt extruded from an extruder including a die provided with a discharge cross-section of a particular shape, pelletization is performed by a method typically used in industry such as strand cutting or underwater cutting, and then the resultant pellets are foamed to obtain the resin foam particles, a method in which a blowing agent is injected partway along a barrel of an extruder, foaming is performed simultaneously with discharging, and then underwater cutting or strand cutting is performed after cooling to directly obtain the resin foam particles, or a method in which the resin is melted in an extruder, is extruded from a die having a desired cross-sectional shape, and is cut to a specific length by a pelletizer after being cooled to produce base material resin pellets that are subsequently impregnated with a blowing agent and are foamed with a certain expansion ratio through heating.

The resin foam particles of the present embodiment contain a resin. The resin may, for example, be a thermoplastic resin.

Examples of thermoplastic resins that may be used include styrene-based polymers such as polystyrene poly(c-methylstyrene), styrene-maleic anhydride copolymer, a blend or graft polymer of polyphenylene oxide and polystyrene, acrylonitrile-styrene copolymer, acrylonitrile-butadiene-styrene terpolymer, styrene-butadiene copolymer, and high impact polystyrene, vinyl chloride-based polymers such as polyvinyl chloride, vinyl chloride-vinyl acetate copolymer, post-chlorinated polyvinyl chloride, and copolymer of vinyl chloride and ethylene or propylene, polyvinylidene chloride-based copolymer resin, nylon 6, nylon 6,6, homopolymerized or copolymerized polyamide resin, polyethylene terephthalate, homopolymerized or copolymerized polyester-based resin, modified polyphenylene ether resin (phenylene ether-polystyrene alloy resin), polycarbonate resin, methacrylimide resin, polyphenylene sulfide, polysulfone, polyethersulfone, polyester-based resin, phenolic resin, urethane resin, and polyolefin-based resin.

Polypropylene-based resins such as polypropylene, ethylene-propylene random copolymer, propylene-butene random copolymer, ethylene-propylene block copolymer, and ethylene-propylene-butene terpolymer and polyethylene-based resins such as low-density polyethylene, medium-density polyethylene, linear low-density polyethylene, linear ultra-low-density polyethylene, high-density polyethylene, ethylene-vinyl acetate copolymer, ethylene-methyl methacrylate copolymer, and ionomer resin that are polymerized using a Ziegler catalyst, a metallocene catalyst, or the like may be used individually or in a mixed form as the polyolefin-based resin.

The resin preferably has a surface tension of 37 mN/m to 60 mN/m, and more preferably 38 mN/m to 55 mN/m at 20° C. This is particularly preferable because a resin foam shaped product that displays sound absorption and has high mechanical strength can be obtained when the surface tension is within any of the ranges set forth above.

The surface tension of the resin is taken to be a value measured by a method in which the temperature in the method described in JIS K6768 "Plastics-Film and Sheeting-Determination of Wetting Tension" is changed to 20° C.

Examples of thermoplastic resins included within the preferable surface tension ranges set forth above include thermoplastic resins such as polyamide resin, polyester resin, polyether resin, methacrylic-based resin, modified polyether resin (phenylene ether-polystyrene alloy resin), and the like having a surface tension within any of the ranges set forth above. Among these examples, polyamide resin is an example of a resin having excellent heat resistance, chemical resistance, and solvent resistance that is suitable for high heat resistance foam structural material applications and modified polyether resin (phenylene ether-polystyrene alloy resin) is an example of a resin having excellent heat resistance and high-temperature rigidity.

By setting the surface tension of the resin within any of the ranges set forth above, particularly during heated expansion and fusion of foamed resin through superheated steam, affinity between steam and the surface of the resin is high and, as a result, a uniform foam shaped product having high fusion strength can be obtained. The surface tension of the resin may be taken as the surface tension of a mixed resin of all resin contained in the resin foam particles. It is preferable that the surface tension of at least one resin among all resin contained in the resin foam particles satisfies any of the ranges set forth above, and more preferable that the surface tension of all resin contained in the resin foam particles satisfies any of the ranges set forth above.

The glass-transition temperature of the resin is preferably not lower than −10° C. and not higher than 280° C.

The glass-transition temperature of the resin is taken to be a value measured by DSC in accordance with JIS K7121: 1987 "Testing Methods for Transition Temperatures of Plastics". In other words, a specimen is conditioned at a temperature of 23±2° C. and a relative humidity of 50±5% for 24 hours or more, is placed in a vessel of a DSC apparatus, is heated to a temperature at least approximately 30° C. higher than at the end of a glass transition in the case of an amorphous resin or to a temperature at least approximately 30° C. higher than the end of a melting peak in the case of a crystalline resin, is held at that temperature for 10 minutes, and is then rapidly cooled to a temperature approximately 50° C. lower than the glass-transition temperature. In terms of the heating rate, a temperature of approximately 50° C. lower than the transition temperature is held in advance until the apparatus is stabilized, heating is then performed to a temperature approximately 30° C. higher than at the end of the transition at a heating rate of 20° C. per minute, and a DSC curve is plotted.

The lower limit for the glass-transition temperature of the resin raw material is more preferably 0° C., and even more preferably 10° C. A glass-transition temperature that is not lower than any of the lower limits set forth above is preferable because reduction of sound absorption performance due to long term compressive force on a shaped article can be inhibited, and adoption for a sound absorbing member on which stress acts is also possible.

The upper limit for the glass-transition temperature is more preferably 260° C., and even more preferably 240° C. A glass-transition temperature that is not higher than any of the upper limits set forth above is particularly preferable because a low temperature can be set in foam shaping and foam can be produced with high productivity.

Examples of thermoplastic resins included within the preferable glass-transition temperature ranges set forth above include thermoplastic resins such as polyamide resin, polyester resin, polyether resin, methacrylic-based resin, modified polyether resin (phenylene ether-polystyrene alloy resin), and the like having a glass-transition temperature within any of the ranges set forth above.

Among these examples, polyamide resin is an example of a resin having excellent heat resistance, chemical resistance, and solvent resistance that is suitable for high heat resistance foam structural material applications and modified polyether resin (phenylene ether-polystyrene alloy resin) is an example of a resin having excellent heat resistance and high-temperature rigidity The glass-transition temperature of the resin may be the glass-transition temperature of a mixed resin of all resin contained in the resin foam particles. It is preferable that the glass-transition temperature of at least one resin among all resin contained in the resin foam particles satisfies any of the ranges set forth above, and more preferable that the glass-transition temperature of all resin contained in the resin foam particles satisfies any of the ranges set forth above.

The thermoplastic resin may be used in a non-crosslinked state or may be used after crosslinking using a peroxide, radiation, or the like.

The resin foam particles of the present embodiment may, depending on the objective, contain typical compounding agents such as antioxidants, light stabilizers, ultraviolet absorbers, flame retardants, colorants (for example, dyes and pigments), plasticizers, lubricants, crystallization nucleating agents, and inorganic fillers (for example, talc and calcium carbonate) as necessary.

Examples of flame retardants that can be used include those based on bromine and phosphorus, examples of antioxidants that can be used include those based on phenol, phosphorus, and sulfur, and examples of light stabilizers that can be used include those based on hindered amines and benzophenone.

A cell modifier may be added in a case in which it is necessary to adjust the average cell diameter of the resin foam particles. Examples of cell modifiers include inorganic nucleating agents such as talc, silica, calcium silicate, calcium carbonate, aluminum oxide, titanium oxide, diatomaceous earth, clay, sodium bicarbonate, alumina, barium sulfate, aluminum oxide, and bentonite. The amount of cell modifier that is used is normally 0.005 parts by mass to 2 parts by mass relative to the total amount of raw material of the resin foam particles.

The blowing agent used in production of the resin foam particles of the present embodiment may, for example, be a volatile blowing agent. Examples of volatile blowing agents include chain and cyclic lower aliphatic hydrocarbons such as methane, ethane, propane, butane, isobutane, pentane, isopentane, neopentane, hexane, heptane, cyclopentane, cyclohexane, and methylcyclopentane; halogenated hydrocarbons such as dicyclodifluoromethane, trichloromonofluoromethane, 1-chloro-1,1-difluoroethane, and 1-chloro-2,2,2-trifluoroethane; and blowing agents based on inorganic gases such as nitrogen, air, and carbon dioxide.

[Resin Foam Shaped Product]

A resin foam shaped product of the present embodiment is a shaped product obtained by fusing together the above-described resin foam particles. In other words, the resin foam shaped product of the present embodiment is a shaped product including at least a section where at least two of the above-described resin foam particles are fused to one another. Fused sections and pores are present between resin foam particles that have fused. The resin foam shaped product of the present embodiment can be used as a sound-proofing member. This soundproofing member preferably includes the resin foam shaped product of the present embodiment and may be composed of just the resin foam shaped product of the present embodiment.

The resin foam shaped product of the present embodiment includes pores that are continuous between resin foam particles that have fused and has a porosity of 15% to 80% (more preferably 30% to 70%).

The porosity can be measured by a method subsequently described in the EXAMPLES section.

The proportion constituted by the resin foam particles among the whole resin foam shaped product in the resin foam shaped product of the present embodiment is preferably 98 weight % or more since this enables the performance of the resin foam particles having a recessed external part to be substantially obtained.

The resin foam shaped product of the present embodiment is a shaped product obtained through fusion of an assembly of the resin foam particles to one another and is required to have pores that are continuous between resin foam particles. The phrase "pores that are continuous" as used in the present specification means that as a result of pores being formed that are continuous between resin foam particles that are fused to one another, pores that are continuous between two opposing faces (between two surfaces) of the resin foam shaped product arise such that a state in which a fluid can flow is obtained. The resin foam shaped product of the present embodiment preferably has pores that are continuous in at least one direction, and preferably has pores that are continuous in a thickness direction. In the present embodiment, the connected pores are preferably present in a manner such that when a plate-like resin foam shaped product sample of 10 mm in thickness is used to measure unit length flow resistance in the thickness direction by the AC method described in International Standard ISO 9053, the unit length flow resistance is 1,000,000 N·s/m$^4$ or less, and more preferably 500,000 N·s/m$^4$ or less.

The resin foam shaped product of the present embodiment can be produced by loading the resin foam particles into a closed mold and performing foaming, but may be produced by loading the resin foam particles into a mold that cannot be tightly sealed and heating the resin foam particles to fuse the resin foam particles to one another. Depending on the type of resin and the shaping conditions, a general-purpose in-mold foaming automated shaping machine may be used.

In the present embodiment, the desired balance of sound absorption performance and mechanical strength can be adjusted by producing the resin foam shaped product using a mixture of, in any ratio, resin foam particles having a recessed external part and particles of a typical shape that are resin foam particles of a spheroidal shape, a circular columnal shape, a polygonal columnal shape, or the like that do not have a recessed external part.

The resin foam shaped product of the present embodiment may be used as a shaped product by itself or may be used laminated in any form with a fiber assembly layer such as an inorganic or organic woven fabric or non-woven fabric or with an inorganic or organic porous body layer. The laminated layer may be laminated and adhered to a foam shaped article as a skin material in order to enhance external appearance and surface characteristics of a product. Alternatively, a method may be adopted in which, during bead molding, a skin material is set in a mold and then foamed resin beads are loaded into the mold and foam shaping is performed to achieve thermal fusion.

[Laminate]

A laminate according to the present disclosure is a laminate that includes a surface material (I) including a fiber assembly and a base material (II) including the above-described resin foam shaped product, wherein the fiber assembly has a mass per unit area of 10 g/m$^2$ to 300 g/m$^2$, an average apparent density of 0.10 g/cm$^3$ to 1.0 g/cm$^3$, an average fiber diameter of 0.6 μm to 50 μm, and an air permeability of 2 cc/(cm$^2$·sec) to 70 cc/(cm$^2$·sec), and the laminate has a thickness of 3 mm to 80 mm.

The laminate of the present embodiment may include other layers besides the surface material (I) and the base material (II), such as a gas barrier layer, an antistatic later, a surface hardening layer, an electromagnetic shielding layer, a lubricant layer, a conductive layer, a dielectric layer, an electrical insulation layer, an anti-fogging layer, a magnetic body layer, a print layer, or a decorative layer. In particular, it is preferable that the laminate is composed of only the surface material (I) and the base material (II) from a viewpoint of obtaining even better sound absorption performance.

The thickness of the laminate of the present embodiment is 3 mm to 80 mm from a viewpoint of obtaining an excellent balance of sound absorption performance, rigidity, and strength with light weight, and is preferably 5 mm to 50 mm, and more preferably 10 mm to 30 mm.

(Base Material (II))

The following describes the base material (II) including a resin foam shaped product having connected pores that is used to form the laminate of the present embodiment. The resin foam shaped product having connected pores is preferably a resin foam shaped product obtained through fusion and shaping of resin foam particles as previously described.

The base material (II) includes this resin foam shaped product. In particular, it is preferable that the base material (II) is composed of only the resin foam shaped product. Besides the resin foam shaped product, the base material (II) may include a resin layer containing an additive such as inorganic or organic particles, a flame retardant, or a stabilizer.

The thickness of the base material (II) is preferably 2 mm to 78 mm, and more preferably 5 mm to 28 mm from a viewpoint of obtaining an excellent balance of sound absorption performance, rigidity, and strength with light weight.

The shape of the base material is not limited and may be any shape having two opposite faces that spread out in two dimensions as main surfaces without being limited to a flat shape. Moreover, the shape may be such that the surface of a shaped article has a curved surface from a design viewpoint or may be a shape having protrusions and depressions provided in part thereof to an extent that does not cause loss of sound absorption performance. In a case in which the thickness of the base material is not constant, the minimum distance between opposite surfaces of the base material is preferably 2 mm to 78 mm, and more preferably 5 mm to 28 mm from a viewpoint of obtaining an excellent balance of sound absorption performance, rigidity, and strength with light weight.

The resin foam shaped product can be produced by loading the resin foam particles into a closed mold and performing foaming, or a method may be adopted in which the resin foam particles are loaded into a mold that cannot be tightly sealed and are heated to fuse the resin foam particles to one another. Depending on the type of resin and the shaping conditions, a general-purpose in-mold foaming automated shaping machine may be used.

The desired balance of sound absorption performance and mechanical strength can be adjusted by producing the resin foam shaped product using a mixture of, in any ratio, resin foam particles having a recessed external part and particles of a typical shape that are resin foam particles of a spheroidal shape, circular columnal shape, polygonal columnal shape, or the like that do not have a recessed external part.

[Surface Material (I)]

The following describes the surface material (I) including the fiber assembly that is used to form the laminate of the present embodiment.

The surface material (I) includes the fiber assembly. In particular, it is preferable that the surface material (I) is composed of only the fiber assembly. Besides the fiber assembly, the surface material (I) may include a resin layer containing an antioxidant, a light stabilizer, an ultraviolet absorber, a flame retardant, a colorant such as a dye or a pigment, a plasticizer, a lubricant, a crystallization nucleating agent, an inorganic filler such as talc or calcium carbonate, or the like.

The thickness of the surface material (I) is preferably 0.05 mm to 2.0 mm, more preferably 0.07 mm to 1.5 mm, and even more preferably 0.1 mm to 1.0 mm.

The mass per unit area of the fiber assembly is 10 $g/m^2$ to 300 $g/m^2$, preferably 20 $g/m^2$ to 250 $g/m^2$, and more preferably 25 $g/m^2$ to 200 $g/m^2$. A mass per unit area of less than 10 $g/m^2$ is undesirable because sound absorption performance of the laminate decreases, whereas a mass per unit area of more than 300 $g/m^2$ is undesirable because durability tends to decrease.

The mass per unit area of the fiber assembly can be measured by a method subsequently described in the EXAMPLES section.

The average apparent density of the fiber assembly is 0.10 $g/cm^3$ to 1.0 $g/cm^3$, preferably 0.12 $g/cm^3$ to 0.90 $g/cm^3$, and more preferably 0.15 $g/cm^3$ to 0.80 $g/cm^3$. Sound absorption performance of the laminate decreases if the average apparent density of the fiber assembly is less than 0.10 $g/cm^3$, whereas compactness increases and stability of close contact between the surface material and the base material decreases if the average apparent density of the fiber assembly is more than 1.0 $g/cm^3$.

The average apparent density of the fiber assembly can be measured by a method subsequently described in the EXAMPLES section.

The average fiber diameter of the fiber assembly is 1 μm to 50 μm, preferably 1.5 μm to 40 μm, and more preferably 2.0 μm to 30 μm. An average fiber diameter of less than 1 μm in the fiber assembly is undesirable because durability of the surface material tends to decrease, whereas an average fiber diameter of more than 50 μm in the fiber assembly is undesirable because the sound absorption coefficient tends to decrease.

The average fiber diameter of the fiber assembly can be measured by a method subsequently described in the EXAMPLES section.

The air permeability of the fiber assembly is 2 cc/($cm^2 \cdot sec$) to 70 cc/($cm^2 \cdot sec$), preferably 3 cc/($cm^2 \cdot sec$) to 60 cc/($cm^2 \cdot sec$), and more preferably 5 cc/($cm^2 \cdot sec$) to 50 cc/($cm^2 \cdot sec$). Air permeability of less than 2 cc/($cm^2 \cdot sec$) for the fiber assembly is undesirable because sound absorption performance decreases on average, whereas an air permeability of more than 70 cc/($cm^2 \cdot sec$) is undesirable because although sound absorption performance increases, a high sound absorption coefficient is displayed over a narrower frequency region.

The air permeability of the fiber assembly can be measured by a method subsequently described in the EXAMPLES section.

The fiber assembly may be an assembly composed of one type of fibers or an assembly composed of a plurality of types of fibers. Moreover, the fiber assembly may be a single layer or may be a laminate of layers formed by different types of fibers. The form of the fiber assembly is not specifically limited and may, for example, be in the form of a woven fabric, non-woven fabric, felt, or the like.

From a viewpoint of obtaining even better sound absorption performance and excellent laminate strength, it is preferable that the surface material (I) is a fiber assembly laminate including three layers that are a thermoplastic synthetic fiber layer (A) having an average fiber diameter of 5 μm to 50 μm as one surface layer (also referred to as "layer (A)" in the present specification), a thermoplastic synthetic microfiber layer (B) having an average fiber diameter of 0.3 μm to 10 μm as an intermediate layer (also referred to as "layer (B)" in the present specification), and a layer (C) containing thermoplastic synthetic fibers having an average fiber diameter of μm to 50 μm as another surface layer (also referred to as "layer (C)" in the present specification), or is a fiber assembly laminate composite obtained by stacking 2 to 30 sheets of the fiber assembly laminate.

Sound absorption of the laminate decreases if the mass per unit area and average apparent density of the fiber assembly laminate are too small, whereas compactness increases but stability of close contact between the surface material and the base material decreases if the mass per unit area and average apparent density of the fiber assembly laminate are too large. Moreover, sound absorption performance decreases on average if the air permeability of each layer of the fiber assembly laminate is too low, whereas an excessively high air permeability is undesirable because although maximum sound absorption performance increases, a high sound absorption coefficient is displayed over a narrower frequency region.

The average fiber diameter of the layer (A) and the layer (C) in the fiber assembly laminate is preferably 5 μm to 50 μm, and the average fiber diameter of the layer (B) in the fiber assembly laminate is preferably 0.3 μm to 10 μm. The average fiber diameter of the layer (A) and the average fiber diameter of the layer (C) may be the same or different.

The average fiber diameter of the layer (A) is more preferably 7 μm to μm, and even more preferably 10 μm to 30 μm. The average fiber diameter of the layer (C) is more preferably 7 μm to 40 μm, and even more preferably 10 μm to 30 μm. The average fiber diameter of the layer (B) is more preferably 1.0 μm to 10 μm, even more preferably 1.5 μm to 9 μm, further preferably 2.0 μm to 8 μm, and particularly preferably not less than 2.0 μm and less than 7 μm.

In other words, the layer (A) and the layer (C) have a comparatively large fiber diameter such that large fiber gaps are formed. By providing the layer (B) of microfibers in-between the layers (A) and (C), it is easy to form a thin layer including microfibers that become covered in gaps in the thick fiber support and, as a result, extremely small fiber gaps of not more than several micrometers can be formed, and excellent sound absorption can be obtained.

The fiber assembly laminate may, for example, be a layered non-woven fabric of long fiber non-woven fabric obtained by the spunbond method or the like, and is preferably a layered non-woven fabric having a three layer structure (A/B/C) in which layers (A) and (C) having an average fiber diameter of 5 μm to 50 μm are laminated at both sides of a layer (B) having an average fiber diameter of 0.3 μm to 10 μm that serves as an intermediate layer. It is preferable that one surface layer (A) of the layered non-woven fabric contains thermoplastic synthetic fibers having a high melting point (for example, 230° C. to 300° C.) and that the other surface layer (C) of the layered non-woven fabric contains a plurality of types of fibers having a melting point difference of 20° C. or more (preferably 25° C. or more).

Examples of the thermoplastic synthetic fibers used in the layer (A) include polyester fibers such as polyethylene terephthalate, polybutylene terephthalate, and copolymerized polyester, and polyamide fibers such as nylon 6, nylon 66, and copolymerized polyamide. In a case in which the layer (C) contains a plurality of types of thermoplastic synthetic fibers, the thermoplastic synthetic fibers used in the layer (A) preferably have a melting point that is 20° C. or more (preferably 25° C. or more) higher than the melting point of thermoplastic synthetic fibers having the lowest melting point among thermoplastic synthetic fibers contained in the layer (C).

The thermoplastic synthetic fibers used in the layer (A) and the thermoplastic synthetic fibers contained in the layer (C) may be the same type of fibers or different types of fibers. It is preferable that the same type of fibers are used from a viewpoint of bonding strength between layers.

The microfibers of the layer (B) are a layer formed like a thin film and cover gaps of the synthetic fibers in the layer (A) and the layer (C) to several micrometers or less. Therefore, the average fiber diameter of the microfibers is 0.3 μm to 10 μm, preferably 1.2 μm to 7 μm, and more preferably 1.5 μm to 3 μm.

The average fiber diameter of fibers included in at least one microfiber layer (B) included in the non-woven fabric surface material is preferably 0.3 μm to 7 μm, more preferably 0.4 μm to 5 μm, and even more preferably 0.6 μm to 2 μm. Fibers cannot be stably obtained if the fiber diameter is less than 0.3 μm because the conditions required for spinning with a fiber diameter of less than 0.3 μm are severe. On the other hand, if the fiber diameter is more than 7 μm, upon combination with the layers (A) and (C) having an average fiber diameter of 10 μm to 30 μm, an effect of the fibers entering gaps in a continuous long fiber layer as fine fibers to fill the gaps cannot be achieved because the fiber diameter is close to the average fiber diameter of fibers contained in the layers (A) and (C), and thus a compact structure cannot be obtained.

The surface material may be a fiber assembly laminate or a fiber assembly laminate composite obtained through stacking of 2 to 30 (preferably 2 to 10) fiber assembly laminates. If the number of fiber assembly laminates exceeds 30, this is undesirable because it becomes difficult to stably hold the surface material, an air layer may easily become included therein during processing, and uniformity of thickness tends to decrease.

The polymer forming the microfibers may, for example, suitably be a synthetic resin that has low viscosity and can form microfibers by a melt blowing process. For example, synthetic fibers such as polyolefin fibers (for example, low-density polyethylene, high-density polyethylene, polypropylene, copolymerized polyethylene, or copolymerized polypropylene), polyester-based fibers (for example, polyethylene terephthalate, polybutylene terephthalate, aromatic polyester copolymer obtained through copolymerization of polyethylene terephthalate with one or more compounds from among phthalic acid, isophthalic acid, sebacic acid, adipic acid, diethylene glycol, and 1,4-butanediol, or aliphatic polyester), or copolymerized polyamide may be used.

The thermoplastic synthetic fibers used in the layer (C) may be synthetic fibers such as polyolefin fibers (for example, low-density polyethylene, high-density polyethylene, polypropylene, copolymerized polyethylene, or copolymerized polypropylene), polyester-based fibers (for example, polyethylene terephthalate, aromatic polyester copolymer obtained through copolymerization of polyethylene terephthalate with one or more compounds from among phthalic acid, isophthalic acid, sebacic acid, adipic acid, diethylene glycol, and 1,4-butanediol, or aliphatic polyester), or copolymerized polyamide.

These types of fibers may be used individually or as combined filaments of two or more types. Moreover, combined filaments of low melting point fibers and high melting point fibers may be used. Moreover, the use of composite fibers having a sheath-core structure including a high melting point component as a core and a low melting point component as a sheath is preferable. For example the core may be a high melting point component (for example, having a melting point of 230° C. to 300° C.) that is polyethylene terephthalate, polybutylene terephthalate, copolymerized polyester, nylon 6, nylon 66, copolymerized polyamide, or the like, and the sheath may be a low melting point component (for example, having a melting point of 210° C. to 280° C.; component having melting point 20° C. to 180° C. lower than high melting point component of core, for example) that is low-density polyethylene, high-density polyethylene, polypropylene, copolymerized polyethylene, copolymerized polypropylene, copolymerized polyester, aliphatic ester, or the like. Of these combinations, the thermoplastic synthetic fibers contained in the layer (A) preferably have a melting point that is at least 20° C. higher than the melting point of a low melting point component of the layer (C).

The surface material (I) may have been subjected to function imparting treatment such as coloring (for example, dyeing), water-repellent treatment (for example, with a fluororesin), or flame retardant treatment (for example, with a phosphoric flame retardant) with the aim of imparting color, water repellency, flame retardance, or the like.

Figure 4:
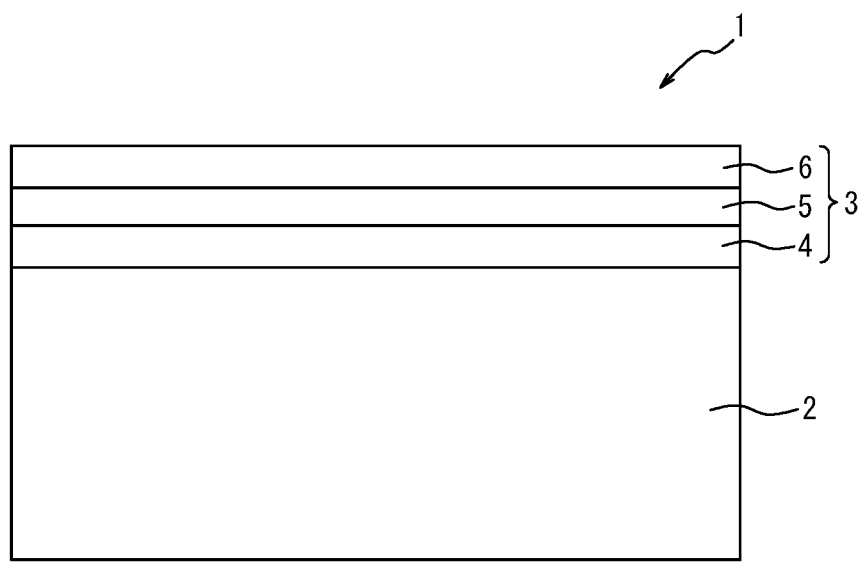
FIG. 4 illustrates an example of a cross-section of a laminate of a present embodiment.

FIG. 4 illustrates one example of the laminate of the present embodiment.

The laminate 1 of the present embodiment includes a surface material (I) 3 and a base material (II) 2. The surface material 3 may be a fiber assembly laminate including three layers constituted by a layer (A) 4, a layer (B) 5, and a layer (C) 6.

No specific limitations are placed on the number of layers of the surface material (I) and the base material (II) that are laminated in the laminate of the present embodiment. The laminate of the present embodiment may be a laminate in which a base material (II) is laminated at one side of a surface material (I) such that the laminate includes one surface material and one base material (FIG. 4), or may be a laminate in which a surface material (I) is laminated at both sides of a base material (II) such that the laminate includes one base material and two surface materials.

In a case in which the previously described fiber assembly laminate is used as the surface material (I), the base material (II) may be contact with the layer (A) or may be in contact with the layer (C). In particular, a configuration in which lamination is performed such that the layer (C) and the base material (II) are in contact is preferable from a viewpoint of obtaining excellent laminate strength after thermal lamination and even better sound absorption performance.

Moreover, in a case in which two or more sheets of the previously described fiber assembly laminate are stacked, these fiber assembly laminates may be laminated such that the layer (A) of one of the fiber assembly laminates and the layer (C) of another of the fiber assembly laminates are positioned on top of one another or such that the layer (A) of one of the fiber assembly laminates and the layer (A) of another of the fiber assembly laminates are positioned on top of one another. In particular, it is preferable that lamination is performed such that the layer (A) of one fiber assembly laminate and the layer (C) of another fiber assembly laminate are positioned on top of one another from a viewpoint of obtaining excellent laminate strength after thermal lamination and even better sound absorption performance.

The following describes the method of laminating the surface material (I) and the base material (II) in the laminate of the present embodiment.

Means for laminating a base material (II) including a resin foam shaped product at one side of a surface material (I) including a fiber assembly include a method involving thermal adhesion and a method in which lamination and unification are achieved via an adhesive. However, it is preferable that the surface material (I) and the base material (II) are simply stacked to form the laminate (composite sound absorbing material) without using an adhesive. By avoiding the use of an adhesive, air permeability between the surface material (I) and the base material (II) can be reliably ensured, and stable sound absorption performance can be maintained. In a case in which lamination is performed by simple stacking in this manner, unification may be achieved by fitting the surface material (I) and the base material (II) into a certain frame so as to secure at least the ends thereof. In a case in which lamination and unification are achieved via an adhesive, the adhesive may be provided in a partial manner so as to ensure air permeability. If the adhesive forms a film such that it becomes an adhesive layer and air permeability is lost, the infiltration of sound from the surface material (I) to the base material (II) may be impaired, leading to reduced sound absorption performance. The method by which an adhesive is provided in a partial manner as described above may involve using a thermal adhesive that is in a powder or fibrous form. Moreover, adhesion and unification may be achieved by heating and melting a surface of the base material (II) that is to become a surface at a side corresponding to the surface material (I) (for example, the fiber assembly laminate), and then pasting this surface with the surface material (I) (for example, the fiber assembly laminate).

Specific examples of methods of lamination of the surface material (I) and the base material (II) by thermal adhesion include a thermal adhesion method in which the surface material (I) and the base material (II) are heated and pressed by a net, a roll, or the like in a heating atmosphere that causes softening or melting of fibers contained in the surface material (I) and resin contained in the base material (II) to cause adhesion between the surface material (I) and the base material (II); an adhesion method in which a hot melt powder, adhesive, or the like is applied onto the surface material and/or the base material by spraying, rolling, or the like, and then the surface material and the base material are joined by heat treatment or the like; and an adhesive sheet method in which adhesion is achieved by interposing a sheet such as a non-woven fabric containing low melting point fibers, a non-woven fabric having a spider web-like form, a tape yarn cloth, a hot melt film, or a mesh between the sheet material (I) and the substrate (II).

In the present embodiment, in a case in which two or more fiber assembly laminates are stacked as the surface material (I), the individual fiber assembly laminates may be laminated sequentially or two or more fiber assembly laminates may be laminated simultaneously.

The laminate (composite sound absorbing material) of the present embodiment is installed for use with the side corresponding to the surface material (I) including the fiber assembly positioned at a side where sound is incident on the laminate. By positioning the side corresponding the surface material (I) including the fiber assembly at the side where sound is incident, sound absorption performance can be effectively improved.

The laminate of the present embodiment can be used as a member for blocking various types of noise, such as a soundproofing member for an automobile or other vehicle. In particular, by selecting a hard thermoplastic resin as the base material, for example, the laminate of the present embodiment can be used by itself as a freestanding soundproofing material without further lamination of the laminate with other members.

EXAMPLES

The following describes embodiments of the present disclosure through examples. However, the scope of the present disclosure is not in any way limited by these examples.

Evaluation methods used in the examples and comparative examples were as follows.

(1) Density $\rho_0$ (g/Cm³) of Resin

The mass W (g) of pre-foaming resin was measured and then the volume V (cm³) of the resin was measured by water submersion. The density of the resin was taken to be W/V (g/cm³).

(2) True Density $\rho_1$ (g/Cm³) of Resin Foam Particles

The mass W (g) of resin foam particles was measured and then the volume V (cm³) of the resin foam particles was measured by water submersion. The true density of the resin foam particles was taken to be W/V (g/cm³).

The density of resin raw material pellets after preliminary foaming was measured using a gravimeter.

(3) Bulk Density $\rho_2$ (g/Cm³) of Resin Foam Particles

The bulk density of resin foam particles was calculated from the following formula by loading 100 g of resin foam particles into a graduated cylinder, vibrating the graduated cylinder until the volume of the resin foam particles was constant, flattening the upper surface of the resin foam particles, and then measuring the bulk volume $V_1$ (cm³) as a value read from a marking corresponding to the upper surface, the mass $W_1$ (g) of the graduated cylinder with the resin foam particles loaded therein, and the mass $W_0$ (g) of the graduated cylinder.

$$\rho_2 = [W_1 - W_0]/V_1$$

(4) Average particle diameter D (mm) of resin foam particles

Standard sieves prescribed by JIS Z8801 that had nominal sizes of $d_1$=5.6 mm, $d_2$=4.75 mm, $d_3$=4 mm, $d_4$=3.35 mm, $d_5$=2.36 mm, $d_6$=1.7 mm, $d_7$=1.4 mm, and $d_8$=1 mm were used to classify 100 g of resin foam particles. The average particle diameter D of the whole assembly of particles was calculated from the following formula by taking the weight proportion of particles passing through a sieve $d_i$ but stopping at a sieve $d_{i+1}$ to be $X_i$.

$$D = \Sigma X_i (d_i \cdot d_{i+1})^{1/2}$$

(i represents an integer of 1 to 7.)

(5) Porosity (%) of Resin Foam Shaped Product

The porosity of a resin foam shaped product was determined by the following formula.

Porosity of resin foam shaped product (%)=$[(B-C)/B] \times 100$

In the above formula, B is the apparent volume (cm³) of the resin foam shaped product and C is the true volume (cm³) of the resin foam shaped product. The apparent volume is the volume calculated from external dimensions of the shaped product, whereas the true volume C is the actual volume of the shaped product excluding pores. The true volume C is obtained by measuring the increase in volume when the resin foam shaped product is submerged in a liquid (for example, alcohol).

(6) Presence of Continuous Pores

The presence of continuous pores was judged as follows based on measurement of unit length flow resistance.

The unit length flow resistance was measured using the AC method of International Standard ISO 9053 using a flow resistance measurement system AirReSys produced by Nihon Onkyo Engineering Co., Ltd. Specifically, a plate-like resin foam shaped product sample of 10 mm in thickness was used to measure differential pressure P (Pa) between the front and rear surfaces of the material in a state with a uniform flow at a flow rate F of 0.5 mm/s, and then the unit length flow resistance was determined from the differential pressure and the material thickness t (m) as P/(t·F) (N·s/m⁴). A case in which the unit length flow resistance was 200,000 N·s/m⁴ or less was evaluated as a case in which continuous pores were present (Yes), and a case in which the unit length flow resistance exceeded 200,000 N·s/m⁴ was evaluated as a case in which continuous pores were not present (No).

(7) Fusion Strength of Resin Foam Shaped Product

Tensile strength of a resin foam shaped product was measured based on JIS K6767A. Fusion strength was evaluated as "excellent" in a case in which elongation at break of the resin foam shaped product was 2% or more, "good" in a case in which elongation at break was not less than 1% and less than 2%, and "poor" in a case in which elongation at break was less than 1%.

(8) Sound Absorption Characteristics of Resin Foam Shaped Product

The sound absorption coefficient at normal incidence was measured at 23° C. based on JIS A 1405-2. A plate-like resin foam shaped product of 30 mm in thickness was prepared, a circular disc of 41 mm in diameter and 30 mm in thickness was cut out therefrom, and the sound absorption coefficient at normal incidence was measured at 23° C. for frequencies of 200 Hz to 5,000 Hz using a normal incidence sound absorption coefficient measurement system WinZacMTX produced by Nihon Onkyo Engineering Co., Ltd. In this measurement, average sound absorption coefficients were measured for 1/3 octave bands having the 11 points of 200 Hz, 250 Hz, 315 Hz, 400 Hz, 500 Hz, 630 Hz, 800 Hz, 1000 Hz, 1250 Hz, 1600 Hz, and 2000 Hz as central frequencies thereof. Sound absorption characteristics were evaluated as "excellent" in a case in which there were 5 or more frequencies for which the sound absorption coefficient was 20% or more (among the average sound absorption coefficients of the 11 bands), "good" in a case in which there were not fewer than 3 and not more than 4 frequencies for which the sound absorption coefficient was 20% or more, and "poor" in a case in which there were 2 or fewer frequencies for which the sound absorption coefficient was 20% or more.

(9) Sound Absorption Characteristics after Compression Test

A plate-like resin foam shaped product of 30 mm in thickness was subjected to a compression creep test in accordance with JIS K6767 under conditions of a temperature of 40° C. and a stress of 0.020 MPa. The sound absorption coefficient at normal incidence of the resin foam shaped product at 23° C. straight after the end of a 168 hour test was evaluated in the same way as in "(8) Sound absorption characteristics of resin foam shaped product".

(10) Mass Per Unit Area (g/m²) of Surface Material

The mass per unit area of a surface material was taken to be a value evaluated by the method described in "Mass per unit area (ISO method)" in JIS L-1913 "Test methods for nonwovens".

(11) Average Apparent Density (g/Cm³) of Surface Material

The average thickness of a surface material was evaluated in accordance with the method described in "Thickness (ISO method)" of JIS L-1913 "Test methods for nonwovens", and then the average apparent density of the surface material (=mass per unit area of surface material/thickness) was determined from the value for the mass per unit area of the surface material described above in section (10).

(12) Average Fiber Diameter (μm) of Surface Material

A micrograph was taken at ×500 magnification using a microscope and then an average value for the diameters of 30 randomly selected fibers was determined.

(13) Air Permeability (Cc/(Cm²·Sec)) of Surface Material

Air permeability of a surface material was measured in accordance with the method described in JIS L-1096 "Testing methods for woven and knitted fabrics".

(14) Sound Absorption Characteristics of Laminate

The sound absorption coefficient at normal incidence of a laminate was measured using the same device and measurement method as described above in section (8) and with a surface material side of the laminate as the incident surface of sound. In this measurement, average sound absorption coefficients were measured for 1/3 octave bands having the 11 points of 200 Hz, 250 Hz, 315 Hz, 400 Hz, 500 Hz, 630 Hz, 800 Hz, 1000 Hz, 1250 Hz, 1600 Hz, and 2000 Hz as central frequencies thereof. Sound absorption characteristics were evaluated as "excellent" in a case in which there were more than 6 frequencies for which the sound absorption coefficient was 30% or more (among the average sound absorption coefficients of the 11 bands), "very good" in a case in which there were 5 or 6 frequencies for which the sound absorption coefficient was 30% or more, "good" in a case in which there were not fewer than 3 and not more than 4 frequencies for which the sound absorption coefficient was 30% or more, and "poor" in a case in which there were 2 or fewer frequencies for which the sound absorption coefficient was 30% or more.

Example 1

Figure 3:
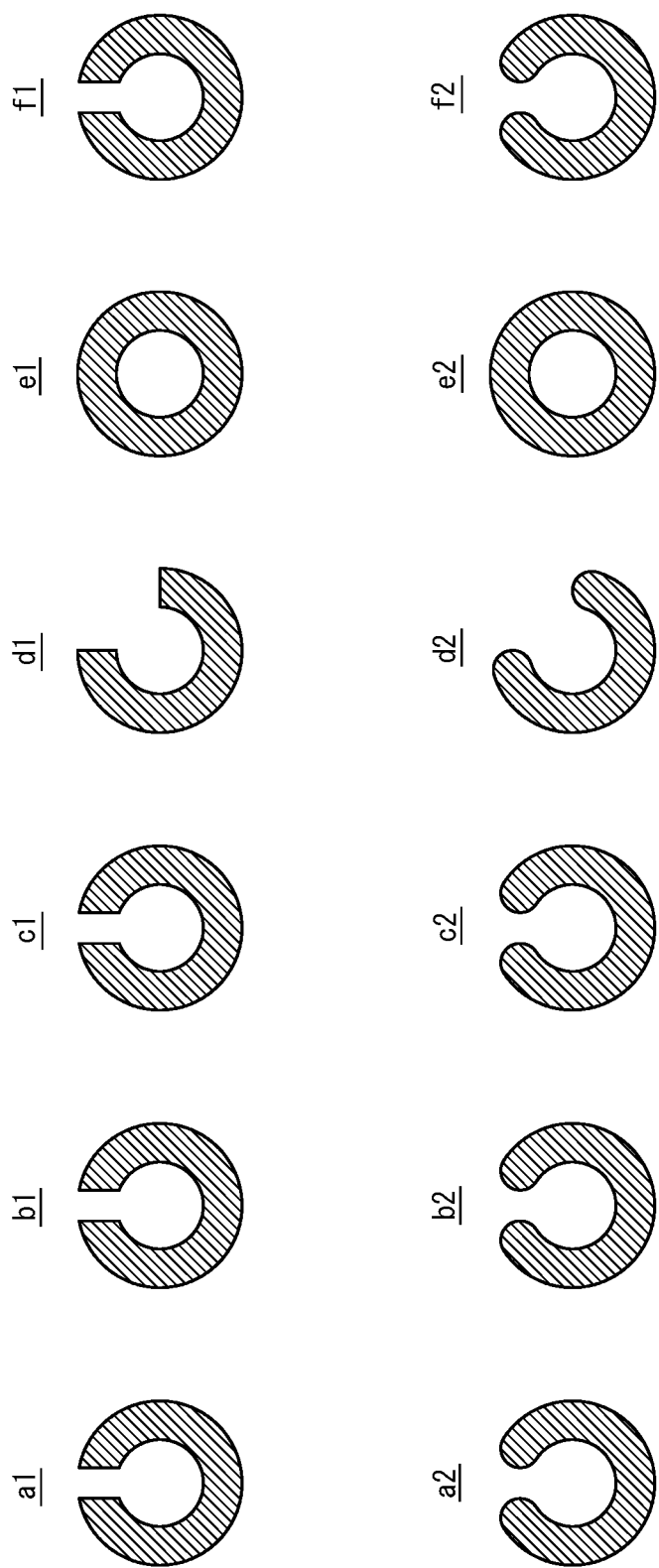
FIG. 3 illustrates cross-sectional views of a discharge outlet shape of profile extrusion dies used in examples and a recessed external part of resin foam particles obtained therewith.

Polyamide 6 resin (UBE Nylon 1022B produced by Ube Industries, Ltd.; surface tension at 20° C.: 46 mN/m) was melted using an extruder and was discharged as a strand from a profile extrusion die having a cross-section shape (a1) illustrated in FIG. 3. The strand was pelletized by a pelletizer to obtain pellets having an average particle diameter of 1.4 mm. The obtained pellets were loaded into a 10° C. autoclave, 4 MPa carbon dioxide gas was blown into the autoclave, and absorption of the carbon dioxide gas was carried out for 3 hours. Next, mini-pellets impregnated with carbon dioxide gas were transferred to a foaming apparatus, 240° C. air was blown into the foaming apparatus for 20 seconds, and an assembly of polyamide resin foam particles was obtained. The average particle diameter of the polyamide resin foam particles contained in the obtained assembly of polyamide resin foam particles was 2.0 mm. When a polyamide resin foam particle was cut and observed, numerous closed cells had been formed uniformly across the cut surface in the polyamide resin foam particle. A cross-section of the polyamide resin foam particles had a recessed external part with a shape (a2) illustrated in FIG. 3.

The obtained assembly of polyamide resin foam particles was loaded into an autoclave again, and absorption of 4 MPa carbon dioxide gas was carried out for 3 hours at 10° C. Next, the polyamide resin foam particles that had been impregnated with carbon dioxide gas were loaded into a mold of an in-mold foam shaping device, 230° C. air was blown in for 30 seconds, and a resin foam shaped product A-1 in which the polyamide resin foam particles were fused together was obtained. The expansion ratio of the resin foam shaped product was 7.5 times. When the resin foam shaped product was cut and observed, an assembly of polyamide resin foam particles having numerous closed cells with a cell diameter of 200 μm to 400 μm had been formed. The presence of continuous pores was confirmed from the measurement value for airflow resistance. Evaluation results for the polyamide resin foam particles and the resin foam shaped product are recorded in Table 1.

Examples 2 to 5

An extruder was used to perform heated melt kneading of 60 mass % of polyphenylene ether-based resin (product name: Xyron TYPE S201A; $\rho_1$ produced by Asahi Kasei Corporation; surface tension at 20° C.: 40 mN/m), 18 mass % of a non-halogen flame retardant (bisphenol A bis(diphenylphosphate) (BBP)), 10 mass % of high impact polystyrene resin (HIPS) having a rubber concentration of 6 mass % (rubber component content of 0.6 mass % in base material resin), and 12 mass % of general-purpose polystyrene resin (PS) (product name: GP685; produced by PS Japan Corporation). A strand was discharged from a profile extrusion die illustrated in FIG. 3 and were pelletized by a pelletizer to obtain pellets. In accordance with a method described in Example 1 of JP H4-372630 A, the above-described pellets were housed in a pressure-resistant vessel as a base material resin, gas inside the vessel was replaced with dry air, carbon dioxide (gas) was subsequently injected as a blowing agent, the pellets serving as the base material resin were impregnated with 7 mass % of carbon dioxide under conditions of a pressure of 3.2 MPa and a temperature of 11° C. over 3 hours, and then the base material resin pellets were foamed by pressurized steam in a foaming furnace while being stirred. The general form of the obtained resin foam particles is illustrated in FIG. 3.

The die discharge outlets in Examples 2, 3, 4, and 5 respectively had the cross-section shapes (b1), (c1), (d1), and (e1) illustrated in FIG. 3. Moreover, the resin foam particles in Examples 2, 3, 4, and 5 respectively had the cross-sections (b2), (c2), (d2), and (e2) illustrated in FIG. 3.

The obtained resin foam particles were transferred to a pressure-resistant vessel, the pressure inside the vessel was raised to 0.5 MPa with compressed air over 1 hour, and then the resin foam particles were held at 0.5 MPa for 8 hours to perform pressure treatment. The resin foam particles were subsequently loaded into a steam hole-containing mold of an in-mold foam shaping device, and were heated with 0.35 MPa pressurized steam to cause expansion and fusion of the resin foam particles to one another. The resin foam particles were then cooled and removed from the mold. In this manner resin foam shaped products A-2 to A-5 were obtained. Note that the resin foam shaped product obtained from resin foam particles of Example 2 is A-2, the resin foam shaped product obtained from resin foam particles of Example 3 is A-3, the resin foam shaped product obtained from resin foam particles of Example 4 is A-4, and the resin foam shaped product obtained from resin foam particles of Example 5 is A-5. The presence of continuous pores was confirmed from the measurement value for airflow resistance. Evaluation results for the resin foam particles and the resin foam shaped products are recorded in Table 1.

Example 6

A mixture of 100 parts by weight of a polycondensate of ethylene glycol, isophthalic acid, and terephthalic acid (isophthalic acid content: 2 weight %; surface tension at 20° C.: 43 nN/m), 0.3 parts by weight of pyromellitic dianhydride, and 0.03 parts by weight of sodium carbonate was melted and kneaded at 270° C. to 290° C. in an extruder. During this melting and kneading, butane was injected from partway along the barrel of the extruder as a blowing agent in a proportion of 1.0 weight % relative to the mixture. After the mixture had passed through a profile extrusion die having a shape (f1) illustrated in FIG. 3 and had undergone preliminary foaming, the mixture was cooled straight away in a cooling water tank and was cut into a small particle form by a pelletizer to produce resin foam particles. The obtained resin foam particles had a cross-section (f2) illustrated in FIG. 3.

Moreover, the resin foam particles had a bulk density of 0.14 g/cm$^3$ and an average particle diameter of 1.5 mm.

The resin foam particles were placed in a tightly sealed vessel and carbon dioxide gas was injected into the vessel with a pressure of 0.49 MPa. The resin foam particles were held in the tightly sealed vessel for 4 hours and were subsequently removed and loaded straight into a mold of an in-mold foam shaping machine. The mold was closed and then steam was introduced into the mold at a gauge pressure of 0.02 MPa for 10 seconds and at a gauge pressure of 0.06 MPa for 20 seconds. Heat was retained for 120 seconds and then water cooling was performed to obtain a resin foam shaped product A-6 in which the resin foam particles were fused together. The presence of continuous pores was confirmed from the measurement value for airflow resistance. Evaluation results for the resin foam particles and the resin foam shaped product are recorded in Table 1.

Example 7

Polyamide 6 resin (UBE Nylon 1022B produced by Ube Industries, Ltd.) was melted using an extruder and was extruded using a die having a structure in which the same shape as the profile extrusion die used in Example 1 was reduced to ⅓ of the size. A discharged strand was pelletized by a pelletizer to obtain pellets having an average particle diameter of 0.5 mm. The obtained pellets were foamed by the method described in Example 1 to obtain polyamide resin foam particles. When a polyamide resin foam particle was cut and observed, numerous closed cells had been formed uniformly across the cut surface in the polyamide resin foam particle. The cross-section of the polyamide resin foam particles had a recessed external part with a shape (a2) illustrated in FIG. 3.

The obtained assembly of polyamide resin foam particles was shaped to obtain a resin foam shaped product A-7 using an in-mold foam shaping device in the same way as in Example 1. Evaluation results for the polyamide resin foam particles and the resin foam shaped product are recorded in Table 1.

Example 8

Polyamide 6 resin (UBE Nylon 1022B produced by Ube Industries, Ltd.) was melted using an extruder and was extruded using a die having a cross-section shape that was the same shape as the profile extrusion die used in Example 1 but enlarged to three times the size. A discharged strand was pelletized by a pelletizer to obtain pellets having an average particle diameter of 6.0 mm. The obtained pellets were foamed by the method described in Example 1 to obtain an assembly of polyamide resin foam particles. The obtained polyamide foam particles had an average particle diameter of 6.0 mm. When a polyamide resin foam particle was cut and observed, numerous closed cells had been formed uniformly across the cut surface in the polyamide resin foam particle. The cross-section of the polyamide resin foam particles had a recessed external part with a shape (a2) illustrated in FIG. 3.

The obtained assembly of polyamide resin foam particles was shaped to obtain a resin foam shaped product A-8 using an in-mold foam shaping device in the same way as in Example 1. Evaluation results for the polyamide resin foam particles and the resin foam shaped product are recorded in Table 1.

Example 9

An ethylene-propylene random copolymer (MI=10 g/10 min; $\rho_1$ ethylene content=2.4 wt %; melting point: 147° C.) was melted using an extruder and was discharged as a strand from a profile extrusion die having a cross-section shape (a1) illustrated in FIG. 3. The strand was rapidly cooled in water and was then pelletized by a pelletizer to obtain pellets having an average particle diameter of 1.4 mm. A mixture of 2.5 parts by weight of carbon dioxide gas as a blowing agent, 0.4 parts by weight of kaolin as a dispersant, 0.004 parts by weight of sodium dodecylbenzenesulfonate as a surfactant, and 240 parts by weight of water relative to 100 parts by weight of the obtained pellets was stirred and dispersed, was heated to 150° C., and was then held at 150° C. for 15 minutes. Thereafter, a back pressure equivalent to equilibrium vapor pressure inside a tightly sealed vessel was applied, and this pressure was maintained while releasing pressure of the vessel to simultaneously release resin particles and water and obtain resin foam particles. When a resin foam particle was cut and observed, numerous closed cells had been formed uniformly across the cut surface in the resin foam particle. The cross-section of the resin foam particles had a recessed external part with a shape (a2) illustrated in FIG. 3.

The resin foam particles were loaded into a steam hole-containing mold of an in-mold foam shaping device, and were heated with 0.3 MPa pressurized steam to cause expansion and fusion of the resin foam particles to one another. The resin foam particles were then cooled and removed from the mold to obtain a resin foam shaped product A-9. The shaping temperature was set to 145° C. The presence of continuous pores was confirmed from the measurement value for airflow resistance. Evaluation results for the resin foam particles and the resin foam shaped product are recorded in Table 1.

Example 10

An aliphatic polyester resin (Bionolle #1001 produced by Showa Highpolymer Co., Ltd.) having 1,4-butanediol and succinic acid as main components was melt-kneaded in an extruder. Thereafter, the melt-kneaded product was extruded from a die having a cross-section shape (a1) illustrated in FIG. 3 and was then rapidly cooled. The obtained strand was subsequently cut to obtain porous resin particles having an average particle diameter of 1.4 mm.

Next, a 5 L autoclave was charged with 100 parts by weight of the resin particles, 300 parts by weight of water (dissolved oxygen concentration: 6 mg/L), 0.5 parts by weight of aluminum oxide, 0.004 parts by weight of sodium dodecylbenzenesulfonate, 1.5 parts by weight of an organic peroxide (NYPER FF; benzoyl peroxide purity: 50%; produced by NOF Corporation), and 0.1 parts by weight of methyl methacrylate, and nitrogen gas was introduced into the autoclave for 5 minutes to adjust the oxygen concentration of the gas phase of the autoclave to 0.3 volume %. The contents of the autoclave were, under stirring, heated to 75° C. at a heating rate of 1.7° C./min, held at the same temperature for 20 minutes, and then heated to 105° C. at a heating rate of 0.5° C./min, carbon dioxide gas was injected as a blowing agent until the autoclave pressure reached 4.0 MPa, and then the contents of the autoclave were held at the same temperature for 45 minutes under stirring to carry out an operation of developing a gel that appears in the resin particles as heated chloroform-insoluble content (gelation) and an operation of causing impregnation of the resin particles with the blowing agent. Thereafter, the contents were cooled to 90° C. at a cooling rate of 1.7° C./min and were held at the same temperature for 5 minutes. One end of the autoclave was opened and the contents were released to atmospheric pressure while maintaining the internal pressure of the autoclave by introducing nitrogen gas into the autoclave so as to foam the resin particles and thereby obtain foam particles. Next, the foam particles were pressurized by air in a tightly sealed vessel to impart a particle internal pressure of 0.12 MPa. The foam particles to which internal pressure had been imparted were then loaded into another vessel, the inside of the vessel was subsequently depressurized to −0.02 MPa, and then heating was performed using a 94° C. heating medium that was a mixture of steam and compressed air to obtain resin foam particles that had been further expanded and foamed. Properties of the obtained resin foam particles are shown in Table 1.

Next, the obtained resin foam particles were loaded into a tightly sealed vessel and a particle internal pressure of 0.12 MPa was imparted on the resin foam particles through pressurization with air. Thereafter, the resin foam particles were loaded into a mold and were heated and shaped using steam with a gauge pressure of 0.10 MPa. The obtained shaped product was cured for 24 hours at 40° C. under atmospheric pressure to obtain a resin foam shaped product A-10. Evaluation results for the resin foam particles and the resin foam shaped product are recorded in Table 1.

Example 1B

A resin foam shaped product A-11 was prepared and evaluated by the same method as in Example 1 with the exception that the thickness of the resin foam shaped product was changed to 20 mm. Evaluation results are recorded in Table 1.

Comparative Examples 1 to 3

Resin foam particles and resin foam shaped products B-1, B-2, and B-3 were obtained under the same conditions as in Examples 1, 2, and 6, respectively, with the exception that the profile extrusion die of the extruder was changed to a normal circular cross-section die that did not have a hollow part. The absence of continuous pores was confirmed from the measurement value for airflow resistance. Evaluation results for the resin foam particles and the resin foam shaped products are recorded in Table 2.

TABLE 1

|  |  | Example 1 | Example 2 | Example 3 | Example 4 | Example 5 |
|---|---|---|---|---|---|---|
| Resin foam particles | Resin type | Polyamide resin | Modified polyphenylene ether resin | Modified polyphenylene ether resin | Modified polyphenylene ether resin | Modified polyphenylene ether resin |
|  | Resin glass-transition temperature (° C.) | 50 | 95 | 95 | 95 | 95 |
|  | Surface tension of resin at 20° C. (mN/m) | 46 | 42 | 42 | 42 | 42 |
|  | Cross-section shape | FIG. 3 (a2) | FIG. 3 (b2) | FIG. 3 (c2) | FIG. 3 (d2) | FIG. 3 (e2) |
|  | $\rho_0$ (g/cm$^3$) | 1.14 | 1.08 | 1.08 | 1.08 | 1.08 |
|  | $\rho_1$ (g/cm$^3$) | 0.32 | 0.22 | 0.22 | 0.22 | 0.22 |
|  | $\rho_2$ (g/cm$^3$) | 0.13 | 0.10 | 0.10 | 0.10 | 0.10 |
|  | $\rho_0/\rho_1$ | 3.6 | 4.9 | 4.9 | 4.9 | 4.9 |
|  | $\rho_1/\rho_2$ | 2.5 | 2.2 | 2.2 | 2.2 | 2.2 |
|  | Average particle diameter (mm) | 2.0 | 1.2 | 2.0 | 1.4 | 2.0 |
| Resin foam shaped product | Type | A-1 | A-2 | A-3 | A-4 | A-5 |
|  | Thickness (mm) | 30 | 30 | 30 | 30 | 30 |
|  | Porosity (%) | 55 | 64 | 60 | 54 | 68 |
|  | Presence of connected pores | Yes | Yes | Yes | Yes | Yes |
|  | Fusion strength | Excellent | Excellent | Excellent | Excellent | Good |
|  | Sound absorption characteristics | Excellent | Excellent | Excellent | Excellent | Excellent |
|  | Sound absorption characteristics after compression creep test | Excellent | Excellent | Excellent | Excellent | Excellent |

|  |  | Example 6 | Example 7 | Example 8 | Example 9 | Example 10 | Example 1B |
|---|---|---|---|---|---|---|---|
| Resin foam particles | Resin type | Copolymerized polyester-based resin | Polyamide resin | Polyamide resin | Ethylene propylene random copolymer resin | Aliphatic polyester resin | Polyamide resin |
|  | Resin glass-transition temperature (° C.) | 67 | 50 | 50 | −5 | −32 | 50 |

TABLE 1-continued

|  |  |  |  |  |  |  |  |
|---|---|---|---|---|---|---|---|
|  | Surface tension of resin at 20° C. (mN/m) | 42 | 46 | 46 | 29 | 38 | 46 |
|  | Cross-section shape | FIG. 3 (f2) | FIG. 3 (a2) | FIG. 3 (a2) | FIG. 3 (a2) | FIG. 3 (a2) | FIG. 3 (a2) |
|  | $\rho_0$ (g/cm³) | 1.34 | 1.14 | 1.14 | 0.90 | 1.26 | 1.14 |
|  | $\rho_1$ (g/cm³) | 0.28 | 0.30 | 0.31 | 0.19 | 0.27 | 0.32 |
|  | $\rho_2$ (g/cm³) | 0.14 | 0.12 | 0.13 | 0.11 | 0.11 | 0.13 |
|  | $\rho_0/\rho_1$ | 4.8 | 3.8 | 3.7 | 4.7 | 4.7 | 3.6 |
|  | $\rho_1/\rho_2$ | 2.0 | 2.5 | 2.4 | 1.7 | 2.5 | 2.5 |
|  | Average particle diameter (mm) | 1.5 | 0.5 | 6.0 | 4.2 | 1.4 | 2.0 |
| Resin foam shaped product | Type | A-6 | A-7 | A-8 | A-9 | A-10 | A-11 |
|  | Thickness (mm) | 30 | 30 | 30 | 30 | 30 | 20 |
|  | Porosity (%) | 52 | 38 | 42 | 37 | 13 | 55 |
|  | Presence of connected pores | Yes | Yes | Yes | Yes | Yes | Yes |
|  | Fusion strength | Excellent | Excellent | Good | Good | Good | Excellent |
|  | Sound absorption characteristics | Good | Good | Excellent | Excellent | Good | Good |
|  | Sound absorption characteristics after compression creep test | Good | Good | Excellent | Good | Poor | Good |

TABLE 2

|  |  | Comparative Example 1 | Comparative Example 2 | Comparative Example 3 |
|---|---|---|---|---|
| Resin foam particles | Resin type | Polyamide resin | Modified polyphenylene ether resin | Copolymerized polyester-based resin |
|  | Resin glass-transition temperature (° C.) | 50 | 95 | 67 |
|  | Surface tension of resin at 20° C. (mN/m) | 46 | 42 | 42 |
|  | Shape | Roughly circular column No recessed external part | Roughly circular column No recessed external part | Roughly circular column No recessed external part |
|  | $\rho_0$ (g/cm³) | 1.14 | 1.08 | 1.34 |
|  | $\rho_1$ (g/cm³) | 0.32 | 0.23 | 0.29 |
|  | $\rho_2$ (g/cm³) | 0.15 | 0.12 | 0.16 |
|  | $\rho_0/\rho_1$ | 3.6 | 4.7 | 4.6 |
|  | $\rho_1/\rho_2$ | 2.1 | 1.9 | 1.8 |
|  | Average particle diameter (mm) | 2.2 | 1.4 | 1.6 |
| Resin foam shaped product | Thickness (mm) | 30 | 30 | 30 |
|  | Porosity (%) | 4 | 4 | 3 |
|  | Presence of connected pores | No | No | No |
|  | Fusion strength | Excellent | Excellent | Excellent |
|  | Sound absorption characteristics | Poor | Poor | Poor |
|  | Sound absorption characteristics after compression creep test | Poor | Poor | Poor |

Fiber Assembly Production Example 1 (F-1)

A fiber assembly used as a surface material was obtained as follows. Polyethylene terephthalate (solution viscosity $\eta_{sp}/C$ according to 1%, 25° C. method using ortho-chlorophenol: 0.77; melting point: 263° C.) was used to form a fiber web (A) (layer (A)) on a collection net by the spunbond method using a spinneret at a spinning temperature of 300° C. Next, polyethylene terephthalate (solution viscosity $\eta_{sp}/C$ according to 25° C. method: 0.50; melting point: 260° C.) was directly sprayed onto this continuous long fiber web (mass per unit area: 45 g/m²; average fiber diameter: 14 μm) as a thread at 1,000 Nm²/hr using a melt blowing nozzle with a spinning temperature of 300° C. and heating air of 320° C. to form microfibers (B) (mass per unit area: 10 g/m²; average fiber diameter: 2 μm) (layer (B)). In addition, a composite long fiber web (C) (mass per unit area: 45 g/m²; average fiber diameter: 18 μm) (layer (C)) formed from high-density polyethylene (melting point: 130° C.) as a sheath component and polyethylene terephthalate (melting point: 263° C.) as a core component using a two component spinneret was laminated on the microfiber web (B) to obtain a layered web. This layered web was subjected to partial thermal pressure bonding with an embossing roll/flat roll temperature of 230° C./105° C. and a linear pressure of 300 N/cm to obtain a fiber assembly F-1 with a mass per unit area of 100 g/m², an average apparent density of 0.25 g/cm³, and a thermal pressure bonding rate of 15%.

Fiber Assembly Production Example 2 (F-2)

A fiber assembly used as a surface material was obtained as follows. Polyethylene terephthalate (solution viscosity $\eta_{sp}/c$ according to 1%, 25° C. method using ortho-chlorophenol: 0.77; melting point: 263° C.) was used to form a fiber web (A) (layer (A)) on a collection net by the spunbond method using a spinneret at a spinning temperature of 300° C. Polyethylene terephthalate (solution viscosity $\eta_{sp}/c$ as above: 0.50; melting point: 260° C.) was directly sprayed onto this continuous long fiber web (mass per unit area: 22.5 g/m$^2$; average fiber diameter: 14 μm) as a thread at 1,000 Nm$^2$/hr using a melt blowing nozzle with a spinning temperature of 300° C. and heating air of 320° C. to form a microfiber web (B) (mass per unit area: 10 g/m$^2$; average fiber diameter: 2 μm) (layer (B)). In addition, a composite long fiber web (C) (mass per unit area: 22.5 g/m$^2$; average fiber diameter: 18 μm) (layer (C)) formed from copolymerized polyester resin (melting point: 130° C.) as a sheath component and polyethylene terephthalate (melting point: 263° C.) as a core component using a two component spinneret was laminated on the microfiber web (B) to obtain a layered web. This layered web was subjected to partial thermal pressure bonding with an embossing roll/flat roll temperature of 230° C./145° C. and a linear pressure of 300 N/cm to obtain a fiber assembly F-2 with a mass per unit area of 55 g/m$^2$, an average apparent density of 0.25 g/cm$^3$, and a thermal pressure bonding rate of 20%.

Fiber Assembly Production Example 3 (F-3)

Polyethylene terephthalate (solution viscosity $\eta_{sp}/c$ according to 1%, 25° C. method using ortho-chlorophenol: 0.77; melting point: 263° C.) was spun from a spinneret to form a fiber web (layer (A)) on a collection net by the spunbond method at a spinning temperature of 300° C. Next, polyethylene terephthalate (solution viscosity $\eta_{sp}/c$ as above: 0.50; melting point: 260° C.) was directly sprayed onto the resultant continuous long fiber web (mass per unit area: 20 g/m$^2$; average fiber diameter: 13 μm) using a melt blowing nozzle under conditions of a spinning temperature of 330° C., heating air of 370° C., and 1,300 Nm$^2$/hr to form a microfiber web (layer (B)) (mass per unit area: 40.0 g/m$^2$; average fiber diameter: 0.8 μm). A continuous long fiber web of polyethylene terephthalate (layer (C)) was formed on the obtained microfiber web in the same way as the aforementioned fiber web (layer (A)). The obtained layered web was subjected to partial thermal pressure bonding with an embossing roll/flat roll temperature of 230° C. and a linear pressure of 30 N/mm to obtain a non-woven fabric surface material with a mass per unit area of 80 g/m$^2$, an average apparent density of 0.29 g/cm$^3$, and a thermal pressure bonding area fraction of 15%.

Fiber Assembly Production Example 4 (G-1)

Polyethylene terephthalate (solution viscosity $\eta_{sp}/c$ according to 1%, 25° C. method using ortho-chlorophenol: 0.77; melting point: 263° C.) was used to form a fiber web on a collection net by the spunbond method using a spinneret at a spinning temperature of 300° C. This continuous long fiber web (mass per unit area: 100 g/m$^2$; average fiber diameter: 14 μm) was then rolled to obtain a fiber assembly (felt) G-1 having a mass per unit area of 100 g/m$^2$ and an average apparent density of 0.23 g/cm$^3$.

Fiber Assembly Production Example 5 (G-2)

Polyethylene terephthalate (solution viscosity $\eta_{sp}/c$ according to 1%, 25° C. method using ortho-chlorophenol: 0.50; melting point: 260° C.) was directly sprayed as a thread at 1,000 Nm$^2$/hr from a melt blowing nozzle with a spinning temperature of 300° C. and heating air of 320° C. to form a microfiber web on a collection net. The resultant continuous long fiber web (mass per unit area: 100 g/m$^2$; average fiber diameter: 2 μm) was rolled to obtain a fiber assembly (felt) G-2 having a mass per unit area of 100 g/m$^2$ and an average apparent density of 0.23 g/cm$^3$.

Examples 11 and 12

A fiber assembly indicated in Table 3 was used as a surface material and a resin foam shaped product indicated in Table 1 was used as a base material. The fiber assembly and the resin foam shaped product were brought into close contact such that the layer (C) of the fiber assembly and the resin foam shaped product were positioned on top of one another, were pressure bonded for 10 seconds at 120° C. and 0.3 MPa using a press, and were stacked and fixed with pressure sensitive adhesive tape attached only at the periphery. Sound absorption characteristics were evaluated.

Examples 13 to 16

Fiber assemblies serving as a surface material were brought into close contact such that layers (A) and (C) of the fiber assemblies were positioned on top of one another, a surface layer (C) of a third fiber assembly and a resin foam shaped product were brought into close contact, and thermal pressure bonding was performed by a heat press for 10 seconds at 150° C. and 0.3 MPa to cause adhesion.

Example 17

A fiber assembly laminate composite used as a surface material was formed of 3 fiber assemblies F-2 that were brought into close contact with layers (A) and (C) thereof positioned on top of one another and were thermal pressure bonded by a heat press for 10 seconds at 150° C. and 0.3 MPa to cause adhesion. In addition, a resin foam shaped product A-6 was used as a base material. The fiber assembly laminate composite and the resin foam shaped product were stacked in close contact such that a layer (A) of the fiber assembly laminate composite and the resin foam shaped product were positioned on top of one another, and were thermal pressure bonded by a heat press for 1 minute at 100° C. and 0.3 MPa to fix the fiber assembly laminate composite and the resin foam shaped product and thereby prepare a laminate. Sound absorption characteristics of the laminate were evaluated.

Example 18

A fiber assembly laminate composite used as a surface material was formed of 10 fiber assemblies F-1 that were brought into close contact with layers (A) and (C) thereof positioned on top of one another, and were thermal pressure bonded by a heat press for 10 seconds at 150° C. and 0.3 MPa to cause adhesion. In addition, a resin foam shaped product A-7 was used as a base material. The fiber assembly laminate composite and the resin foam shaped product were stacked in close contact such that a layer (A) of the fiber assembly laminate composite and the resin foam shaped product were positioned on top of one another, and were thermal pressure bonded by a heat press for 1 minute at 100° C. and 0.3 MPa to fix the fiber assembly laminate composite and the resin foam shaped product and thereby prepare a laminate. Sound absorption characteristics of the laminate were evaluated.

Example 19

A fiber assembly laminate composite used as a surface material was formed of 10 fiber assemblies F-3 that were brought into close contact with layers (A) and (C) thereof positioned on top of one another and were thermal pressure bonded by a heat press for 10 seconds at 150° C. and 0.3 MPa to cause adhesion. In addition, a resin foam shaped product A-8 was used as a base material. The fiber assembly laminate composite and the resin foam shaped product were stacked in close contact such that a layer (A) of the fiber assembly laminate composite and the resin foam shaped product were positioned on top of one another, and were thermal pressure bonded by a heat press for 1 minute at 100° C. and 0.3 MPa to fix the fiber assembly laminate composite and the resin foam shaped product and thereby prepare a laminate. Sound absorption characteristics of the laminate were evaluated.

Example 20

A fiber assembly laminate composite used as a surface material was formed of 3 fiber assemblies F-1 that were brought into close contact with layers (A) and (C) thereof positioned on top of one another and were thermal pressure bonded by a heat press for 10 seconds at 150° C. and 0.3 MPa to cause adhesion. In addition, a resin foam shaped product A-9 was used as a base material. The fiber assembly laminate composite and the resin foam shaped product were stacked in close contact such that a layer (A) of the fiber assembly laminate composite and the resin foam shaped product were positioned on top of one another, and were thermal pressure bonded by a heat press for 1 minute at 100° C. and 0.3 MPa to fix the fiber assembly laminate composite and the resin foam shaped product and thereby prepare a laminate. Sound absorption characteristics of the laminate were evaluated.

Example 21

A fiber assembly laminate composite used as surface material was formed of 3 fiber assemblies F-1 that were brought into close contact with layers (A) and (C) thereof positioned on top of one another and were thermal pressure bonded by a heat press for 10 seconds at 150° C. and 0.3 MPa to cause adhesion. In addition, a resin foam shaped product A-10 was used as a base material. The fiber assembly laminate composite and the resin foam shaped product were stacked in close contact such that a layer (A) of the fiber assembly laminate composite and the resin foam shaped product were positioned on top of one another, and were thermal pressure bonded by a heat press for 1 minute at 100° C. and 0.3 MPa to fix the fiber assembly laminate composite and the resin foam shaped product and thereby prepare a laminate. Sound absorption characteristics of the laminate were evaluated.

Example 22

A laminate was prepared by the same method as in Example 11 with the exception that a resin foam shaped product A-11 (thickness: 20 mm) was used as a base material. Sound absorption characteristics of the laminate were evaluated.

Roughly the same level of sound absorption performance as in Example 1 was obtained, which demonstrates that the laminate of approximately 20 mm in thickness has equivalent performance to a 30 mm shaped product.

Example 23

A fiber assembly laminate composite used as a surface material was formed of 3 fiber assemblies (felt) G-2 that had been stacked and then pressure bonded by a heat press for 10 seconds at 150° C. and 0.3 MPa. In addition, a resin foam shaped product A-2 was used as a base material. The fiber assembly and the resin foam shaped product were stacked in close contact, and were fixed to one another through adhesion only at the periphery. Sound absorption characteristics were evaluated.

Comparative Examples 4 to 7

A combination of a fiber assembly and a resin foam shaped product indicated in Table 4 was used. The fiber assembly and the resin foam shaped product were stacked in close contact such that a layer (A) of the fiber assembly and the resin foam shaped product were positioned on top of one another, and were fixed to one another by adhesion only at the periphery thereof. Sound absorption characteristics were evaluated.

Note that in Comparative Example 7, a product obtained by stacking 3 fiber assemblies G-1 and performing thermal pressure bonding using a heat press for 10 seconds at 150° C. and 0.3 MPa to adhere the fiber assemblies was used as a surface material.

TABLE 3

| | | | Example 11 | Example 12 | Example 13 | Example 14 | Example 15 | Example 16 | Example 17 |
|---|---|---|---|---|---|---|---|---|---|
| Surface material | Type | | F-1 | F-1 | F-1 | F-2 | F-2 | F-2 | F-2 |
| | Layer (A) | Material | PET | PET | PET | PET | PET | PET | PET |
| | | Melting point (° C.) | 263 | 263 | 263 | 263 | 263 | 263 | 263 |
| | | Average fiber diameter (μm) | 14 | 14 | 14 | 14 | 14 | 14 | 14 |
| | | Mass per unit area (g/m$^2$) | 45 | 45 | 45 | 22.5 | 22.5 | 22.5 | 22.5 |
| | Layer (B) | Material | PET | PET | PET | PET | PET | PET | PET |
| | | Melting point (° C.) | 260 | 260 | 260 | 260 | 260 | 260 | 260 |
| | | Average fiber diameter (μm) | 2 | 2 | 2 | 2 | 2 | 2 | 2 |
| | | Mass per unit area (g/m$^2$) | 10 | 10 | 10 | 10 | 10 | 10 | 10 |

TABLE 3-continued

|  |  |  |  |  |  |  |  |  |  |
|---|---|---|---|---|---|---|---|---|---|
|  | Layer (C) | Material | PE/PET | PE/PET | PE/PET | Co-pet/PET | Co-pet/PET | Co-pet/PET | Co-pet/PET |
|  |  | Melting point (° C.) | 130/263 | 130/263 | 130/263 | 130/263 | 130/263 | 130/263 | 130/263 |
|  |  | Average fiber diameter (μm) | 18 | 18 | 18 | 18 | 18 | 18 | 18 |
|  |  | Mass per unit area (g/m$^2$) | 45 | 45 | 45 | 22.5 | 22.5 | 22.5 | 22.5 |
|  | No. of sheets |  | 1 | 1 | 3 | 3 | 3 | 3 | 3 |
|  | Mass per unit area (g/m$^2$) |  | 100 | 100 | 300 | 165 | 165 | 165 | 165 |
|  | Average apparent density (g/cm$^3$) |  | 0.25 | 0.25 | 0.25 | 0.25 | 0.25 | 0.25 | 0.25 |
|  | Average fiber diameter (μm) |  | 14.6 | 14.6 | 14.6 | 13.5 | 13.5 | 13.5 | 13.5 |
|  | Air permeability (cc/(cm$^2$ · sec)) |  | 45 | 45 | 15 | 25 | 25 | 25 | 25 |
|  | Thickness (μm) |  | 400 | 400 | 1200 | 660 | 660 | 660 | 660 |
| Base material | Type |  | A-1 | A-2 | A-2 | A-3 | A-4 | A-5 | A-6 |
|  | Resin foam particles | Resin type | Polyamide resin | Modified polyphenylene ether resin | Modified polyphenylene ether resin | Modified polyphenylene ether resin | Modified polyphenylene ether resin | Modified polyphenylene ether resin | Copolymerized polyester-based resin |
|  |  | Resin glass-transition temperature (° C.) | 50 | 95 | 95 | 95 | 95 | 95 | 67 |
|  |  | Surface tension of resin at °20 C. (mN/m) | 46 | 42 | 42 | 42 | 42 | 42 | 42 |
|  |  | Cross-section shape | FIG. 3 (a2) | FIG. 3 (b2) | FIG. 3 (b2) | FIG. 3 (c2) | FIG. 3 (d2) | FIG. 3 (e2) | FIG. 3 (f2) |
|  |  | $\rho_0$ (g/cm$^3$) | 1.14 | 1.08 | 1.08 | 1.08 | 1.08 | 1.08 | 1.34 |
|  |  | $\rho_1$ (g/cm$^3$) | 0.32 | 0.22 | 0.22 | 0.22 | 0.22 | 0.22 | 0.28 |
|  |  | $\rho_2$ (g/cm$^3$) | 0.13 | 0.10 | 0.10 | 0.10 | 0.10 | 0.10 | 0.14 |
|  |  | $\rho_0/\rho_1$ | 3.6 | 4.9 | 4.9 | 4.9 | 4.9 | 4.9 | 4.8 |
|  |  | $\rho_1/\rho_2$ | 2.5 | 2.2 | 2.2 | 2.2 | 2.2 | 2.2 | 2.0 |
|  |  | Average particle diameter (mm) | 2.0 | 1.2 | 1.2 | 2.0 | 1.4 | 2.0 | 1.5 |
|  | Resin foam shaped product | Thickness (mm) | 30 | 30 | 30 | 30 | 30 | 30 | 30 |
|  |  | Porosity (%) | 55 | 64 | 64 | 60 | 54 | 68 | 52 |
|  |  | Presence of connected pores | Yes | Yes | Yes | Yes | Yes | Yes | Yes |
|  |  | Fusion strength | Excellent | Excellent | Excellent | Excellent | Excellent | Good | Excellent |
|  |  | Sound absorption characteristics | Excellent | Excellent | Excellent | Excellent | Excellent | Excellent | Good |
| Laminate | Thickness (mm) |  | 30 | 30 | 31 | 31 | 31 | 31 | 31 |
|  | Sound absorption characteristics |  | Excellent | Excellent | Excellent | Excellent | Excellent | Excellent | Excellent |
|  | Sound absorption characteristics after compression creep test |  | Excellent | Excellent | Excellent | Excellent | Excellent | Excellent | Excellent |

|  |  |  |  | Example 18 | Example 19 | Example 20 | Example 21 | Example 22 | Example 23 |
|---|---|---|---|---|---|---|---|---|---|
|  | Surface material | Type |  | F-1 | F-3 | F-1 | F-1 | F-1 | G-2 |
|  |  | Layer (A) | Material | PET | PET | PET | PET | PET | PET |
|  |  |  | Melting point (° C.) | 263 | 263 | 263 | 263 | 263 | 260 |
|  |  |  | Average fiber diameter (μm) | 14 | 13 | 14 | 14 | 14 | 2 |
|  |  |  | Mass per unit area (g/m$^2$) | 45 | 20 | 45 | 45 | 45 | 100 |
|  |  | Layer (B) | Material | PET | PET | PET | PET | PET | — |
|  |  |  | Melting point (° C.) | 260 | 260 | 260 | 260 | 260 | — |
|  |  |  | Average fiber diameter (μm) | 2 | 0.8 | 2 | 2 | 2 | — |
|  |  |  | Mass per unit area (g/m$^2$) | 10 | 40 | 10 | 10 | 10 | — |
|  |  | Layer (C) | Material | PE/PET | PET | PE/PET | PE/PET | PE/PET | — |
|  |  |  | Melting point (° C.) | 130/263 | 263 | 130/263 | 130/263 | 130/263 | — |
|  |  |  | Average fiber diameter (μm) | 18 | 13 | 18 | 18 | 18 | — |
|  |  |  | Mass per unit area (g/m$^2$) | 45 | 20 | 45 | 45 | 45 | — |
|  |  | No. of sheets |  | 10 | 10 | 3 | 3 | 1 | 3 |
|  |  | Mass per unit area (g/m$^2$) |  | 1000 | 800 | 300 | 300 | 100 | 300 |
|  |  | Average apparent density (g/cm$^3$) |  | 0.25 | 0.29 | 0.25 | 0.25 | 0.25 | 0.28 |
|  |  | Average fiber diameter (μm) |  | 14.6 | 6.9 | 14.6 | 14.6 | 14.6 | 2 |
|  |  | Air permeability (cc/(cm$^2$ · sec)) |  | 15 | 5 | 15 | 15 | 45 | 25 |
|  |  | Thickness (μm) |  | 4000 | 2000 | 1200 | 1200 | 400 | 1070 |
|  | Base material | Type |  | A-7 | A-8 | A-9 | A-10 | A-11 | A-2 |
|  |  | Resin foam particles | Resin type | Polyamide resin | Polyamide resin | Ethylene propylene random copolymer resin | Aliphatic polyester resin | Polyamide resin | Modified polyphenylene ether resin |

TABLE 3-continued

|  |  |  |  |  |  |  |  |  |
|---|---|---|---|---|---|---|---|---|
|  |  | Resin glass-transition temperature (° C.) | 50 | 50 | −5 | −32 | 50 | 95 |
|  |  | Surface tension of resin at °20 C. (mN/m) | 46 | 46 | 29 | 38 | 46 | 42 |
|  |  | Cross-section shape | FIG. 3 (a2) | FIG. 3 (a2) | FIG. 3 (a2) | FIG. 3 (a2) | FIG. 3 (a2) | FIG. 3 (b2) |
|  |  | $\rho_0$ (g/cm$^3$) | 1.14 | 1.14 | 0.90 | 1.26 | 1.14 | 1.08 |
|  |  | $\rho_1$ (g/cm$^3$) | 0.30 | 0.31 | 0.19 | 0.27 | 0.32 | 0.22 |
|  |  | $\rho_2$ (g/cm$^3$) | 0.12 | 0.13 | 0.11 | 0.11 | 0.13 | 0.10 |
|  |  | $\rho_0/\rho_1$ | 3.8 | 3.7 | 4.7 | 4.7 | 3.6 | 4.9 |
|  |  | $\rho_1/\rho_2$ | 2.5 | 2.4 | 1.7 | 2.5 | 2.5 | 2.2 |
|  |  | Average particle diameter (mm) | 0.5 | 6.0 | 4.2 | 1.4 | 2.0 | 1.2 |
|  | Resin foam shaped product | Thickness (mm) | 30 | 30 | 30 | 30 | 20 | 30 |
|  |  | Porosity (%) | 38 | 42 | 37 | 13 | 55 | 64 |
|  |  | Presence of connected pores | Yes | Yes | Yes | Yes | Yes | Yes |
|  |  | Fusion strength | Excellent | Good | Good | Good | Excellent | Excellent |
|  |  | Sound absorption characteristics | Good | Excellent | Excellent | Good | Good | Excellent |
| Laminate | Thickness (mm) |  | 34 | 32 | 31 | 31 | 20 | 31 |
|  | Sound absorption characteristics |  | Excellent | Excellent | Excellent | Very good | Very good | Excellent |
|  | Sound absorption characteristics after compression creep test |  | Excellent | Excellent | Good | Good | Very good | Excellent |

TABLE 4

|  |  |  |  | Comparative Example 4 | Comparative Example 5 | Comparative Example 6 | Comparative Example 7 |
|---|---|---|---|---|---|---|---|
| Laminate | Surface material | Type |  | F-1 | F-1 | F-1 | G-1 |
|  |  | Layer (A) | Material | PET | PET | PET | PET |
|  |  |  | Melting point (° C.) | 263 | 263 | 263 | 263 |
|  |  |  | Average fiber diameter (μm) | 14 | 14 | 14 | 14 |
|  |  |  | Mass per unit area (g/m$^2$) | 45 | 45 | 45 | 100 |
|  |  | Layer (B) | Material | PET | PET | PET | — |
|  |  |  | Melting point (° C.) | 260 | 260 | 260 | — |
|  |  |  | Average fiber diameter (μm) | 2 | 2 | 2 | — |
|  |  |  | Mass per unit area (g/m$^2$) | 10 | 10 | 10 | — |
|  |  | Layer (C) | Material | PE/PET | PE/PET | PE/PET | — |
|  |  |  | Melting point (° C.) | 130/263 | 130/263 | 130/263 | — |
|  |  |  | Average fiber diameter (μm) | 18 | 18 | 18 | — |
|  |  |  | Mass per unit area (g/m$^2$) | 45 | 45 | 45 | — |
|  |  | No. of sheets |  | 1 | 1 | 1 | 3 |
|  |  | Mass per unit area (g/m$^2$) |  | 100 | 100 | 100 | 300 |
|  |  | Average apparent density (g/cm$^3$) |  | 0.25 | 0.25 | 0.25 | 0.23 |
|  |  | Average fiber diameter (μm) |  | 14.6 | 14.6 | 14.6 | 14.0 |
|  |  | Air permeability (cc/(cm$^2$ · sec)) |  | 45 | 45 | 45 | 90 |
|  |  | Thickness (μm) |  | 400 | 400 | 400 | 1300 |
|  | Base material | Type |  | B-1 | B-2 | B-3 | A-2 |
|  |  | Resin foam particles | Resin type | Polyamide resin | Modified polyphenylene ether resin | Copolymerized polyester-based resin | Modified polyphenylene ether resin |
|  |  |  | Resin glass-transition temperature (° C.) | 50 | 95 | 67 | 95 |
|  |  |  | Surface tension of resin at 20° C. (mN/m) | 46 | 42 | 42 | 42 |
|  |  |  | Cross-section shape | Roughly circular column No recessed external part | Roughly circular column No recessed external part | Roughly circular column No recessed external part | FIG. 3 (b2) |
|  |  |  | $\rho_0$ (g/cm$^3$) | 1.14 | 1.08 | 1.34 | 1.08 |
|  |  |  | $\rho_1$ (g/cm$^3$) | 0.32 | 0.23 | 0.29 | 0.22 |
|  |  |  | $\rho_2$ (g/cm$^3$) | 0.15 | 0.12 | 0.16 | 0.10 |
|  |  |  | $\rho_0/\rho_1$ | 3.6 | 4.7 | 4.6 | 4.9 |

TABLE 4-continued

| | | | Comparative Example 4 | Comparative Example 5 | Comparative Example 6 | Comparative Example 7 |
|---|---|---|---|---|---|---|
| | | $\rho_1/\rho_2$ | 2.1 | 1.9 | 1.8 | 2.2 |
| | | Average particle diameter (mm) | 2.2 | 1.4 | 1.6 | 1.2 |
| | Resin foam shaped product | Thickness (mm) | 30 | 30 | 30 | 30 |
| | | Porosity (%) | 4 | 4 | 3 | 64 |
| | | Presence of connected pores | No | No | No | Yes |
| | | Fusion strength | Excellent | Excellent | Excellent | Excellent |
| | | Sound absorption characteristics | Poor | Poor | Poor | Excellent |
| Laminate | Thickness (mm) | | 30 | 30 | 30 | 31 |
| | Sound absorption characteristics | | Poor | Poor | Poor | Good |
| | Sound absorption characteristics after compression creep test | | Poor | Poor | Poor | Poor |

INDUSTRIAL APPLICABILITY

Through fusion and shaping of resin foam particles having a particular shape in accordance with the present disclosure, it is possible to produce a resin foam shaped product having continuous pores that displays both sound absorption performance and excellent mechanical strength.

The production of a foam that has a controlled structure of continuous pores and that displays high sound absorption, which was previously difficult, becomes possible according to the present disclosure, and thus various sound absorbing members in which the features of bead foam shaping are exploited can be produced with high efficiency. The laminate of the present embodiment, which includes a base material and a surface material, displays equivalent sound absorption performance to a resin foam shaped product even when provided as a thinner sheet than the resin foam shaped product, and thus a laminate having high sound absorption performance is provided.

Examples of applications for a connected pore foam shaped product produced using resin foam particles having a specific structure in accordance with the present disclosure and for the laminate of the present embodiment including a base material and a surface material include members that are used for operating noise reduction in aircraft and vehicles (for example, automobiles, electric trains, and steam trains) for which weight reduction and sound reduction are required. In particular, applications for sound absorbing members such as automobile engine covers, engine capsules, engine room hoods, transmission casings, sound absorbing covers, motor casings for electric vehicles, sound absorbing covers, and the like are particularly suitable.

Moreover, the connected pore foam shaped product produced using resin foam particles having a specific structure in accordance with the present disclosure and the laminate of the present embodiment including a base material and a surface material can suitably be used in cases in which sound reduction is required for air conditioning equipment such as air conditioners, refrigeration equipment, heat pumps and the like, parts forming air channels such as ducts, various household appliances such as washing machines, dryers, refrigerators, and vacuum cleaners, OA machines such as printers, photocopiers, and fax machines, and also for construction materials such as wall core materials and floor core materials.

REFERENCE SIGNS LIST 1 laminate
2 base material
3 surface material
4 layer (A)
5 layer (B)
6 layer (C)

The invention claimed is:

1. A laminate comprising a surface material (I) including a fiber assembly and a base material (II) including a resin foam shaped product, wherein
   the resin foam shaped product is obtained by fusing together resin foam particles comprising a resin and having a recessed external part,
   a ratio $\rho_0/\rho_1$ of density $\rho_0$ of the resin and true density $\rho_1$ of the resin foam particles is 2 to 20,
   a ratio $\rho_1/\rho_2$ of true density $\rho_1$ of the resin foam particles and bulk density $\rho_2$ of the resin foam particles is 1.5 to 4.0,
   the resin foam shaped product includes pores that are continuous between the resin foam particles that have been fused and has a porosity of 15% to 80%,
   the fiber assembly has a mass per unit area of 10 g/m² to 300 g/m², an average apparent density of 0.10 g/cm³ to 1.0 g/cm³, an average fiber diameter of 0.6 µm to 50 µm, and an air permeability of 2 cc/(cm²·sec) to 70 cc/(cm²·sec), and
   the laminate has a thickness of 3 mm to 80 mm.

2. The laminate according to claim 1, wherein the surface material (I) is a fiber assembly laminate including three layers that are a thermoplastic synthetic fiber layer (A) having an average fiber diameter of 5 µm to 50 µm as one surface layer, a thermoplastic synthetic microfiber layer (B) having an average fiber diameter of 0.3 µm to 10 µm as an intermediate layer, and a layer (C) containing thermoplastic synthetic fibers having an average fiber diameter of 5 µm to 50 µm as another surface layer, or is a fiber assembly laminate composite obtained through stacking of 2 to 30 sheets of the fiber assembly laminate.

3. The laminate according to claim 1, wherein the laminate is a freestanding soundproofing material.

* * * * *